(12) United States Patent
Zhang et al.

(10) Patent No.: US 9,445,076 B2
(45) Date of Patent: Sep. 13, 2016

(54) DISPARITY VECTOR CONSTRUCTION METHOD FOR 3D-HEVC

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 13/802,344

(22) Filed: Mar. 13, 2013

(65) Prior Publication Data

US 2013/0265388 A1 Oct. 10, 2013

Related U.S. Application Data

(60) Provisional application No. 61/610,961, filed on Mar. 14, 2012, provisional application No. 61/623,041, filed on Apr. 11, 2012, provisional application No. 61/658,754, filed on Jun. 12, 2012, provisional application No. 61/682,221, filed on Aug. 11, 2012.

(51) Int. Cl.
*H04N 19/00* (2014.01)
*H04N 13/00* (2006.01)
(Continued)

(52) U.S. Cl.
CPC ........ *H04N 13/0048* (2013.01); *H04N 19/139* (2014.11); *H04N 19/513* (2014.11); *H04N 19/52* (2014.11); *H04N 19/597* (2014.11)

(58) Field of Classification Search
CPC ........... H04N 13/0048; H04N 19/513; H04N 19/52; H04N 19/176; H04N 19/573; H04N 13/0022; H04N 19/105; H04N 19/139; H04N 19/593; H04N 19/11; H04N 19/137; H04N 19/172; H04N 19/46; H04N 19/51; H04N 19/527
USPC ............... 348/43, 218.1, 222.1, 233, 448; 375/240.13, 240.24, 240.25, 240.16
See application file for complete search history.

(56) References Cited

U.S. PATENT DOCUMENTS

2005/0046702 A1* 3/2005 Katayama et al. ........ 348/222.1
2005/0206785 A1* 9/2005 Swan et al. ................ 348/448
(Continued)

FOREIGN PATENT DOCUMENTS

| WO | 2008007913 A1 | 1/2008 |
|---|---|---|
| WO | 2012007038 A1 | 1/2012 |
| WO | 2012096164 A1 | 7/2012 |

OTHER PUBLICATIONS

ITU-T H.265, Series H: Audiovisual and Multimedia Systems, Infrastructure of audiovisual services—Coding of moving video, High efficiency video coding, The International Telecommunication Union, Oct. 2014, 540 pp.

(Continued)

*Primary Examiner* — Jeffery Williams
(74) *Attorney, Agent, or Firm* — Shumaker & Sieffert, P.A.

(57) ABSTRACT

When coding multiview video data, a video coder can code one or more pictures in one or more reference views, including a first reference view and determine a disparity vector for a current block based on motion information of one or more neighboring blocks of the current block, wherein the current block is in a second view, wherein the disparity vector points from the current block to a corresponding block in a picture of the same time instance in one of the one or more reference views.

111 Claims, 13 Drawing Sheets

(51) Int. Cl.
*H04N 19/597* (2014.01)
*H04N 19/52* (2014.01)
*H04N 19/139* (2014.01)
*H04N 19/513* (2014.01)

(56) References Cited

U.S. PATENT DOCUMENTS

| | | |
|---|---|---|
| 2007/0064800 A1 | 3/2007 | Ha |
| 2007/0071107 A1* | 3/2007 | Ha ........................ 375/240.24 |
| 2008/0159407 A1* | 7/2008 | Yang et al. ............ 375/240.25 |
| 2008/0285654 A1 | 11/2008 | Cai et al. |
| 2009/0190669 A1 | 7/2009 | Park et al. |
| 2009/0290643 A1 | 11/2009 | Yang |
| 2010/0046846 A1* | 2/2010 | Brown ........................ 382/233 |
| 2010/0091858 A1* | 4/2010 | Yang ........................ 375/240.13 |
| 2010/0135391 A1 | 6/2010 | Tian et al. |
| 2011/0044550 A1 | 2/2011 | Tian et al. |
| 2011/0216833 A1 | 9/2011 | Chen et al. |
| 2012/0062756 A1* | 3/2012 | Tian et al. ................ 348/218.1 |
| 2012/0147137 A1 | 6/2012 | Jeon et al. |
| 2012/0189060 A1 | 7/2012 | Lee et al. |
| 2012/0269271 A1 | 10/2012 | Chen et al. |
| 2013/0003848 A1 | 1/2013 | Sugio et al. |
| 2013/0242046 A1 | 9/2013 | Zhang et al. |
| 2013/0243092 A1 | 9/2013 | Sugio et al. |
| 2013/0336405 A1 | 12/2013 | Chen et al. |
| 2014/0341292 A1 | 11/2014 | Schwarz et al. |
| 2015/0098509 A1 | 4/2015 | Sung et al. |

OTHER PUBLICATIONS

Zheng et al., "Non-CE13: Simplification and improvement of additional merge candidate", JCT-VC Meeting; MPEG Meeting; Geneva; (Joint Collaborative Team on Video Coding of ISO/IEC JTC1/SC29/WG11 and ITU-T SG.16); No. JCTVC-G683, Nov. 21-30, 2011, 8 pp.
Schwarz et al., "Test Model under Consideration for HEVC based 3D video coding", MPEG Meeting; San Jose, CA; (Motion Picture Expert Group or ISO/IEC JTC1/SC29/WG11), No. N12559, Feb. 2012, 45 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen et al., "AHG12: Hooks for temporal motion vector prediction and weighted prediction in HEVC multiview/3DV extension", JCT-VC Meeting; MPEG Meeting; Geneva; (Joint Collaborative Team on Video Coding of ISO/IEC JTC1/SC29/WG11 and ITU-T SG.16 ); No. JCTVC-I0353, Apr. 27-May 7, 2012, 7 pp.
Hannuksela et al., "Suggestion for a depth-enhanced multiview video coding extension to H.264, Annex A: Nokia 3DV Test Model (3DV-TM) Codec Description and Simulation Results", VCEG Meeting; MPEG Meeting; Torino; (Video Coding Experts Group of ITU-T SG.15), No. VCEG-AR14, Feb. 3-10, 2012, 14 pp.

International Search Report and Written Opinion—PCT/US2013/031489—ISA/EPO—Jun. 3, 2013, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Nam et al., "Advanced motion and disparity prediction for 3D video coding", MPEG Meeting; Geneva; (Motion Picture Expert Group or ISO/IEC JTC1/SC29/WG11), No. m22560, Nov. 2011, 6 pp.
Ryu et al., "Adaptive competition for motion vector prediction in multi-view video coding", 3DTV Conference: The True Vision-Capture, Transmission and Display of 3D Video (3DTV-CON), 2011, IEEE, May 16-18, 2011, 4 pp.
Schwarz et al., "Description of 3D Video Coding Technology Proposal by Fraunhofer HHI (HEVC compatible; configuration A)", MPEG Meeting; Geneva; (Motion Picture Expert Group or ISO/IEC JTC1/SC29/WG11), No. m22570, Nov. 2011, 46 pp.
Schwarz et al., "Description of 3D Video Coding Technology Proposal by Fraunhofer HHI (MVC compatible)," MPEG Meeting ISO/IEC JTC1/SC29/WG11, Geneva, Switzerland, Doc. MPEG11/M22569, Nov. 2011, 37 pp.
Schwarz et al., "Description of 3D Video Technology Proposal by Fraunhofer HHI (HEVC compatible, configuration B)", MPEG Meeting; Geneva; (Motion Picture Expert Group or ISO/IEC JTC1/SC29/WG11), No. m22571, Nov. 2011, 46 pp.
Schwarz et al., "Inter-View Prediction of Motion Data in Multiview Video Coding," 2012 Picture Coding Symposium, IEEE, May 7-9, 2012, 4 pp.
Senoh et al., "Disparity vector prediction CE plan for MVC/CE4", MPEG Meeting; Montreux; (Motion Picture Expert Group or ISO / IEC JTC1/SC29/WG11), No. M13166, Apr. 2006, 6 pp.
Stefanoski et al., "Description of 3D Video Coding Technology Proposal by Disney Research Zurich and Fraunhofer HHI," MPEG Meeting—ISO/IEC JTC1/SC29/WG11, Geneva, Switzerland, Doc. MPEG11/M22668, Nov. 2011, 34 pp.
Takahashi et al., "Descriptions of 3D Video Coding Proposal (HEVC-Compatible Category) by Sony", MPEG Meeting; Geneva; (Motion Picture Expert Group or ISO/IEC JTC1/SC29/WG11), No. m22566, Nov. 2011, 36 pp.
Tech et al., "3D-HEVC Test Model 1," Joint Collaborative Team on 3D Video Coding Extension Development of ITU-TSG 16 WP 3 and ISO/IEC JTC 1/SC 29/WG 11, 1st Meeting: Stockholm, SE, Document JCT3V-A1005_d0, Jul. 16-20, 2012, 83 pp.
"Information technology—MPEG video technologies—Part 3: Representation of auxiliary video and supplemental information," ISO/IEC FDIS 23002-3:2007(E), ISO/IEC JTC 1/SC 29/WG 11, MPEG Doc, N81368, Marrakech, Morocoo, Jan. 19, 2007, 33 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Yea et al., "Description of 3D Video Coding Technology Proposed by LG Electronics", MPEG Meeting; Geneva; (Motion Picture Expert Group or ISO/IEC JTC1/SC29/WG11), No. m22577, Nov. 2011, 22 pp.
Zhang et al., "3D-CE5.h related: Disparity vector derivation for multiview video and 3DV", MPEG Meeting; Geneva; (Motion Picture Expert Group or ISO/IEC JTC1/SC29/WG11), No. m24937, Apr.-May 2012, 6 pp.
Bartnik et al., "HEVC Extension for Multi view Video Coding and Multi view Video Plus Depth Coding", VCEG Meeting; MPEG Meeting; Torino; (Video Coding Experts Group of ITU-T SG.16), No. VCEG-AR13, Feb. 3-10, 2021, 42 pp.
Second Written Opinion of international application No. PCT/US2013/031489, mailed Mar. 18, 2014, 10 pp.

(56) References Cited

OTHER PUBLICATIONS

International Preliminary Report on Patentability from international application No. PCT/US2013/031489, mailed Jun. 26, 2014, 13 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Lin, et al., "Motion Vector Coding Techniques for HEVC," IEEE 13th International Workshop on Multimedia Signal Processing (MMSP), Jan. 2011, 6 pp.

* cited by examiner

DISPARITY VECTOR CONSTRUCTION METHOD FOR 3D-HEVC

This application claims the benefit of:
U.S. Provisional Application 61/610,961 filed 14 Mar. 2012;
U.S. Provisional application 61/623,041, filed 11 Apr. 2012;
U.S. Provisional Application 61/658,754, filed 12 Jun. 2012; and
U.S. Provisional Application 61/682,221, filed 11 Aug. 2012,
the entire content of each of which is incorporated by reference herein.

TECHNICAL FIELD

This disclosure relates to video coding and, more particularly, to techniques for coding multiview and three-dimensional (3D) video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to multiview video coding (MVC), and more particularly, this disclosure describes techniques in which a video coder (e.g., video encoder or video decoder) determines a disparity vector for a current block within a current picture of a current view for use in MVC. According to the techniques of this disclosure, the video coder may determine the disparity vector based on the motion information of one or more spatial or temporal neighboring blocks of the current block. The video coder may use the disparity vector to locate a corresponding block in a different view. A video coder may use a disparity vector, determined according to the techniques described in this disclosure, for either or both of inter-view motion vector prediction and inter-view residual prediction or for any other type of inter-view prediction based on a disparity between two views. Any coding tools or techniques that utilize the inter-view correlation of blocks of two views may potentially use a disparity vector determined according to the techniques described in this disclosure.

In one example, a method of decoding multiview video data includes decoding one or more pictures in one or more reference views, including a first reference view and determining a disparity vector for a current block based on motion information of one or more neighboring blocks of the current block, wherein the current block is in a second view. The disparity vector points from the current block to a corresponding block in a picture of the same time instance in one of the one or more reference views.

In another example, a method of encoding multiview video data includes encoding one or more pictures in one or more reference views, including a first reference view and determining a disparity vector for a current block based on motion information of one or more neighboring blocks of the current block. The current block is in a second view, and the disparity vector points from the current block to a corresponding block in a picture of the same time instance in one of the one or more reference views.

In another example, a device for coding multiview video data includes a video decoder configured to decode one or more pictures in one or more reference views, including a first reference view and determine a disparity vector for a current block based on motion information of one or more neighboring blocks of the current block. The current block is in a second view, and the disparity vector points from the current block to a corresponding block in a picture of the same time instance in one of the one or more reference views.

In another example, a device for coding multiview video data includes a video encoder configured to encode one or more pictures in one or more reference views, including a first reference view and determine a disparity vector for a current block based on motion information of one or more neighboring blocks of the current block. The current block is in a second view, and the disparity vector points from the current block to a corresponding block in a picture of the same time instance in one of the one or more reference views.

In another example, a device for decoding multiview video data includes means for decoding one or more pictures in one or more reference views, including a first reference view and means for determining a disparity vector for a current block based on motion information of one or more neighboring blocks of the current block. The current block is in a second view, and the disparity vector points from the current block to a corresponding block in a picture of the same time instance in one of the one or more reference views.

In another example, a device for encoding multiview video data includes means for encoding one or more pictures in one or more reference views, including a first reference view and means for determining a disparity vector for a current block based on motion information of one or more neighboring blocks of the current block. The current block is in a second view, and the disparity vector points from the current block to a corresponding block in a picture of the same time instance in one of the one or more reference views.

In another example, a computer-readable storage medium storing instructions that when executed cause one or more processors to decode one or more pictures in one or more reference views, including a first reference view and determine a disparity vector for a current block based on motion information of one or more neighboring blocks of the current block. The current block is in a second view, and the disparity vector points from the current block to a corresponding block in a picture of the same time instance in one of the one or more reference views.

In another example, a computer-readable storage medium storing instructions that when executed cause one or more processors to encode one or more pictures in one or more reference views, including a first reference view and determine a disparity vector for a current block based on motion information of one or more neighboring blocks of the current block. The current block is in a second view, and the disparity vector points from the current block to a corresponding block in a picture of the same time instance in one of the one or more reference views.

The details of one or more examples are set forth in the accompanying drawings and the description below. Other features, objects, and advantages will be apparent from the description and drawings, and from the claims.

DETAILED DESCRIPTION

Figure 1:
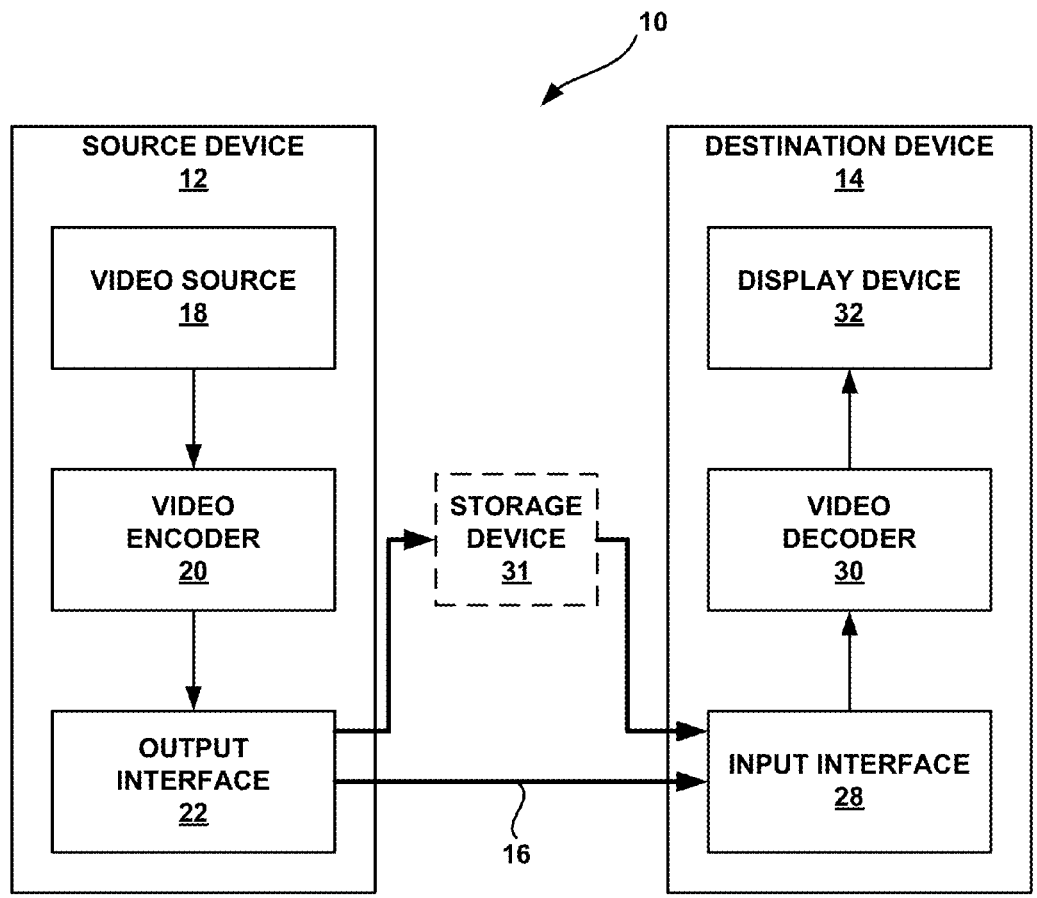
FIG. 1 is a block diagram illustrating an example video encoding and decoding system that may utilize the techniques described in this disclosure.

This disclosure describes techniques related to multiview video coding (MVC), and more particularly, this disclosure describes techniques in which a video coder (e.g., video encoder or video decoder) determines a disparity vector for a current block within a current picture of a current view for use in MVC. According to the techniques of this disclosure, the video coder may determine the disparity vector based on the motion information of one or more spatial or temporal neighboring blocks of the current block. The video coder may use the disparity vector to locate a corresponding block in a different view. A video coder may use a disparity vector, determined according to the techniques described in this disclosure, for either or both of inter-view motion vector prediction and inter-view residual prediction or for any other type of inter-view prediction based on a disparity between two views. In this disclosure, the term "current" is generally used to identify a view, picture, or block currently being coded. Thus, a current block generally represents a block of vide data being coded, as opposed to an already coded block or as opposed to a yet to be coded block.

MVC refers to the manner in which a plurality of views are coded. In the case of three-dimensional (3D) video coding, the plurality of views may, for example, correspond to a left-eye view and a right-eye view. Each view of the plurality of views includes a plurality of pictures. The viewer's perception of a 3D scene is due to the horizontal disparity between objects in the pictures of the different views. The term multiview video coding, or MVC, generically refers to any coding standard that deals with the coding of multiple views. MVC also refers to the techniques in 3D video coding standards that include the coding of texture views, although MVC techniques may also be used for the coding of depth views. For example, MVC may refer to the multiview video coding extension of H.264/AVC, namely H.264/MVC, or the texture coding of the 3D-HEVC, which is an ongoing 3D video extension standard of HEVC. Unless stated to the contrary, in this disclosure, multiview is generally used as generic terminology, while MVC is generally used to refer to the above texture coding technologies.

A disparity vector for a current block of a current picture is a vector that points to a corresponding block in a corresponding picture that is in a different view than the current picture. Thus, using a disparity vector, a video coder can locate, in a corresponding picture, the block of that corresponds to a current block of a current picture. In this case, the corresponding picture is a picture that is of the same temporal instance as the current picture but is in a different view. The corresponding block in the corresponding picture and the current block in the current picture may include similar video content; however, there is at least a horizontal disparity between the location of the current block in the current picture and the location of the corresponding block in the corresponding picture. The disparity vector of the current block provides a measure of this horizontal disparity between the block in the corresponding picture and the current block in the current picture. In some instances, there may also be vertical disparity between the location of the block within the corresponding picture and the location of the current block within the current picture. The disparity vector of the current block may also provide a measure of this vertical disparity between the block in the corresponding picture and the current block in the current picture. A disparity vector contains two components (an x-component and a y-component), although in many instances the vertical component will be equal to zero. The time when the current picture of the current view and the corresponding picture of the different view are displayed may be the same, which is to say the current picture and the corresponding pictures are pictures of the same temporal instance.

This disclosure describes techniques for determining a disparity vector based on the motion information of one or more spatial or temporal neighboring blocks of the current block. As will be explained in greater detail below, once determined, the disparity vector may be used in a variety of different manners in a variety of different portions of a 3D video coding process. For example, a video coder may use the determined disparity vector as part of inter-view motion prediction or inter-view residual prediction. As also will be explained in greater detail below, by using motion information of one or more spatial or temporal neighboring blocks, the techniques of this disclosure may be less complex than existing techniques for determining disparity vectors, particularly because the techniques described herein do not necessarily need to utilize an estimated depth map. Accordingly, the techniques of this disclosure may advantageously reduce video encoder and video decoder complexity and may reduce memory usage and memory accesses.

In video coding, there are generally two types of prediction, commonly referred to as intra-prediction and inter prediction. In intra-prediction, a video coder predicts a block of video in a picture based on an already-coded block in the same picture. In inter prediction, a video coder predicts a block of video in a picture based on an already-coded block of a different picture (i.e. a reference picture). A reference picture, as used in this disclosure, generally refers to any picture that contains samples that may be used for inter prediction in the decoding process of subsequent pictures in decoding order. When coding multiview content, as will be illustrated in the examples below, relative to a current picture, reference pictures may be either of the same temporal instance but in a different view or may be in the same view but of a different temporal instance.

The block of the reference picture used for predicting the block of the current picture is identified by a motion vector. In MVC, there are at least two kinds of motion vectors. The first type of motion vector is a temporal motion vector. A temporal motion vector points to a block in a temporal reference picture that is in the same view as the block being coded but a different time instance than the block being coded. Another type of motion vector is a disparity motion vector. A disparity motion vector points to a block in a picture of the same time instance but in a different view.

As will be explained in greater detail below, a video coder may in some instances signal motion parameters (including motion vectors) utilizing predictive coding techniques, which may require fewer bits than explicit coding of the motion parameters. In the developing HEVC standard, there are two modes for the prediction of motion parameters. In merge mode, the video coder constructs a candidate list of motion parameters, and an index of one of the candidates is signaled in the encoded bitstream. In advanced motion vector prediction (AMVP), a video coder constructs a candidate list of motion vector predictors, and an index of one of the candidates is signaled in the encoded bitstream. For AMVP, the video coder additionally signals motion vector differences, where the motion vector difference is a difference between the motion vector predictor and the actual motion vector used to predict a current block.

Whether a motion vector is a disparity motion vector or a temporal motion vector depends on the reference index with which the motion vector is associated. The reference index identifies a reference picture in a reference picture list. Thus, whether the reference picture is a temporal reference picture or an inter-view reference picture can be determined by checking, for example, if the reference picture and the current picture belong to the same view. When a video coder predicts a block of video data using a temporal motion vector, the corresponding inter prediction is referred to as motion-compensated prediction (MCP). When a video coder predicts a block of video data using a disparity motion vector, the corresponding inter prediction is referred to as disparity-compensated prediction (DCP). A motion vector, no matter if it is a disparity motion vector or a temporal motion vector, contains two components, e.g., an x component and a y component, for identifying a block in a reference picture.

This disclosure describes techniques for determining a disparity vector for a current block based on the motion information (e.g. a disparity motion vector) of one or more spatial or temporal neighboring blocks of the current block. As will be explained in greater detail below, a disparity vector for a current block can be determined by determining spatial disparity vectors (SDVs), temporal disparity vectors (TDVs), and/or implicit disparity vectors (IDVs) for neighboring blocks. IDVs, SDVs, and TDVs will be explained in greater detail below with reference to FIGS. 5-7 below. In some implementations, a determined SDV, TDV, or IDV once identified can be used as a disparity vector for a current block.

In other implementations, a video coder may determine multiple SDVs, TDVs, or IDVs and add the determined candidates to a list of candidate disparity vectors. From the list of candidate disparity vectors, the video coder can select a candidate as the disparity vector for the current block. This disclosure will refer to the list of candidate disparity vectors as disVecCan. In some implementations of the techniques of this disclosure, disVecCan may represent a particular data structure in which candidate disparity vectors are stored, although in this disclosure disVecCan is being used more generically to represent a list of any type. From the candidates in disVecCan, a video coder can select a disparity vector for the current block using techniques described herein.

This disclosure is generally directed to techniques for determining a disparity vector for a current block. Once determined, the disparity vector may be used in any portion of a video coding process that utilizes disparity vectors. A video coder may use a determined disparity vector, for example, to perform inter-view motion prediction and/or inter-view residual prediction. Nevertheless, while this disclosure provides examples of how disparity vectors may be used within in a video coding process, the techniques of this disclosure should not be considered to be limited to any specific type of use of disparity vectors. Any coding tools or techniques that utilize the inter-view correlation of blocks of two views may potentially use a disparity vector determined using the techniques of this disclosure.

FIG. 1 is a block diagram illustrating an example video encoding and decoding system in accordance with one or more examples described in this disclosure. For example, system 10 includes source device 12 and destination device 14. Source device 12 and destination device 14 are configured to implement MVC in which source device 12 and destination device 14 each code pictures of different views. When the pictures of the different views are viewed together, the viewer perceives an image that encompasses a 3D volume, instead of an image that is constrained to the 2D area of the display.

System 10 may operate in accordance with different video coding standards, a proprietary standard, or any other way of multiview coding. For example, video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, referred to as HEVC WD9 is available, as of Feb. 13, 2013, from http://phenix.int-evry.fr/jct/doc_end_user/documents/11_Shanghai/wg11/JCTVC-K1003-v10.zip. For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

The techniques of this disclosure are potentially applicable to several MVC and/or 3D video coding standards, including the HEVC-based 3D-Video coding (3D-HEVC) The latest reference software description for 3D-HEVC is available as: Gerhard Tech, Krzysztof Wegner, Ying Chen, Sehoon Yea, "3D-HEVC Test Model 1," http://phenix.it-sudparis.eu/jct2/doc_end_user/documents/1_Stockholm/wg11/JCT3V-A1005-v1.zip. Stockholm, Sweden, April 2012. The latest reference software, namely HTM is available from: https://hevc.hhi.fraunhofer.de/svn/svn_3DVCSoftware/trunk. The techniques of this disclosure may also be applicable to the H.264/3D-AVC and H.264/MVC+D video coding standards, or extensions thereof, as well as other coding standards. The techniques of this disclosure may at times be described with reference to or using terminology of a particular MVC or 3D video coding standard; however, such description should be interpreted to mean that the described techniques are limited only to that particular standard.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 31. Similarly, encoded data is accessed from storage device 31 by input interface 28. Examples of storage device 31 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 corresponds to a file server or another intermediate storage device that holds the encoded video generated by source device 12. In these examples, destination device 14 accesses stored video data from storage device 31 via streaming or download. The file server is any type of server capable of storing encoded video data and transmitting that encoded video data to the destination device 14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 24 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 31. The encoded video data communicated over link 16, or provided on storage device 31, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Figure 2:
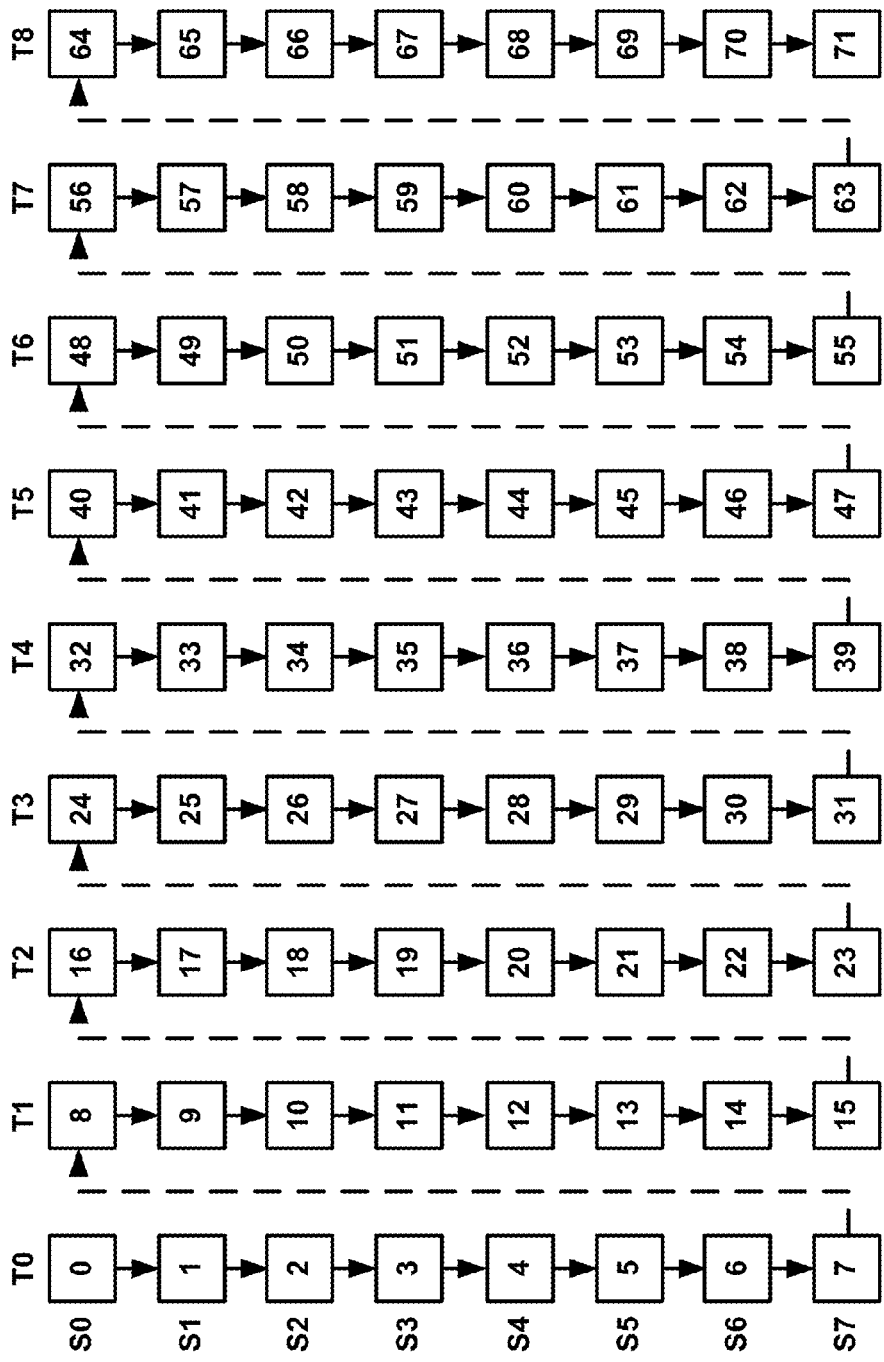
FIG. 2 is a graphical diagram illustrating an example multiview encoding or decoding order, in accordance with one or more examples described in this disclosure.

FIG. 2 is a graphical diagram illustrating an example MVC encoding or decoding order, in accordance with one or more examples described in this disclosure. For example, the decoding order arrangement illustrated in FIG. 2 is referred to as time-first coding. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed.

The depth view component using only luma values (e.g., intensity values) to identify depth is provided for illustration purposes and should not be considered limiting. In other examples, any technique may be utilized to indicate relative depths of the pixels in the texture view component.

In accordance with MVC, the texture view components are inter-predicted from texture view components in the same view or from texture view components in one or more different views. The texture view components may be coded in blocks of video data, which are referred to as "video blocks" and commonly called "macroblocks" in the H.264 context. Other video coding standards, such as the HEVC standard, may refer to video blocks as treeblocks or coding units (CUs).

The pictures of any similar time instance may include similar content. However, the video content of different pictures in a similar time instance may be slightly displaced in the horizontal direction relative to one another. For example, if a block is located at (x, y) in picture 0 of view S0, a block located at (x+x', y) in picture 1 of view S1 includes similar video content as the block located at (x, y) in picture 0 of view S0. In this example, the block located at (x, y) in picture 0 of view S0 and the block located at (x+x', y) in picture 1 of view S1 are considered as corresponding blocks. In some examples, a disparity vector for the block located at (x+x', y) in picture 1 of view S1 refers to the location of its corresponding block. For example, the disparity vector for the block located at (x+x', y) is (−x', 0).

In some examples, video encoder 20 or video decoder 30 may utilize the disparity vector of a block in a picture of a first view to identify the corresponding block in a picture of a second view. Video encoder 20 and video decoder 20 may, for example, utilize the disparity vector when performing inter-view motion prediction or inter-view residual prediction. Video encoder 20 and video decoder 30 may, for example, performing inter-view motion prediction by using information of a reference block of a reference picture in a reference view determined by the disparity vector of the current block.

Figure 3:
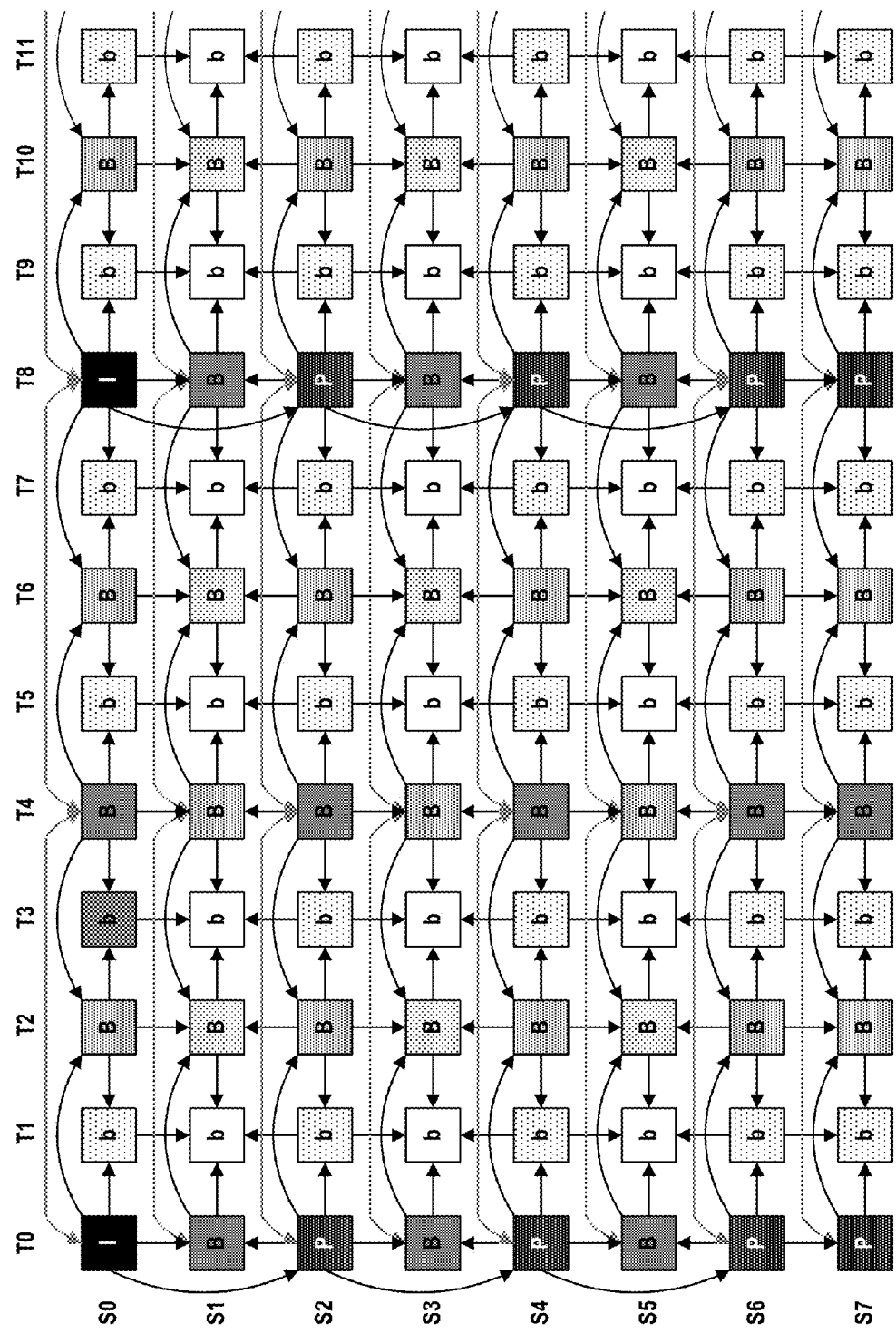
FIG. 3 is a conceptual diagram illustrating an example multiview prediction pattern.

FIG. 3 is a conceptual diagram illustrating an example MVC prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

In FIG. 3, view S0 may be considered as a base view, and views S1-S7 may be considered as dependent views. A base view includes pictures that are not inter-view predicted. Picture in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

Documents m22570 and m22571 define some techniques for 3D-HEVC, and are available, as of Feb. 13, 2013, with password, from http://wg11.sc29.org/doc_end_user/documents/98_Geneva/wg11/m22570-v2-m22570-v2.zip; http://wg11.sc29.org/doc_end_user/documents/98_Geneva/wg11/m22571-v2-m22571-v2.zip. One of the tools described in these documents is inter-view motion prediction where motion parameters (i.e., motion vectors) of a block in a dependent view are predicted or inferred (e.g., in AMVP mode or merge mode) based on already-coded motion parameters in other views of the same access unit. As described in more detail, there may be certain limitations and issues that can arise with the techniques described in the m22570 and m22571 documents. The techniques described in this disclosure potentially overcome some of the limitations and issues that can arise with the techniques described in the m22570 and m22571 documents.

Pictures in FIG. 3 are indicated at the intersection of each row and each column in FIG. 3. The H.264/AVC standard with MVC extensions may use the term frame to represent a portion of the video, while HEVC standard may use the term picture to represent a portion of the video. This disclosure uses the term picture and frame interchangeably.

The pictures in FIG. 3 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be interview predicted. That is, a view component (e.g., a texture view component) can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, pictures used as reference pictures are decoded before pictures that depend on the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view S1 is decoded after views S0 and S2.

In this manner, a hierarchical ordering may be used to describe views S0 through S7. In this disclosure, the notation "SA>SB" means that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate this hierarchical ordering is possible. Accordingly, many different decoding orders are possible, with limitations based on the hierarchical ordering.

In some examples, FIG. 3 may be viewed as illustrating the texture view components. In these examples, to implement inter-view prediction (e.g. inter-view motion prediction or inter-view residual prediction), video encoder 20 or video decoder 30 may in some cases locate a corresponding block using a disparity vector and utilize the motion vector of the corresponding block as a motion vector predictor for the current block that is to be inter-predicted. The techniques described in this disclosure determine the disparity vector of the current block without necessarily needing to derive the depth view component, and without necessarily relying on a global disparity vector.

A video sequence typically includes a series of video pictures from a view (e.g., views illustrated in FIGS. 2 and 3). A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264/MVC standard or largest coding units (LCUs), coding units (CUs), prediction units (PUs), or transform units (TUs), as defined in the HEVC standard. The video blocks may have fixed or varying sizes, and may differ in size according to a specified coding standard. Each video picture may include a plurality of slices. Each slice may include a plurality of blocks.

As an example, the ITU-T H.264 standard supports intra prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view, or refers to a reference picture in another view. The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to (e.g., ITU-T H.264/AVC). For example, whereas H.264 provides nine intra-prediction encoding modes, the HM may provide as many as thirty-three directional/angular intra-prediction encoding modes plus DC and Planar modes.

The working model of the HM describes that a video picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes. Treeblocks are referred to as LCUs in some examples.

A CU includes a coding node and prediction units (PUs) and transform units (TUs) associated with the coding node. A size of the CU corresponds to a size of the coding node and may square in shape. In some examples, the size of the CU ranges from 8×8 pixels up to the size of the treeblock with a maximum of 64×64 pixels or greater. In some examples, each CU contains one or more PUs and one or more TUs. Syntax data associated with a CU describe, for example, partitioning of the CU into one or more PUs. Partitioning modes differ between whether the CU is skip or direct mode encoded, intra-prediction mode encoded, or inter-prediction mode encoded. PUs can be partitioned to be non-square in shape, in some examples. Syntax data associated with a CU also describes, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this is not always the case. The TUs are typically the same size or smaller than the PUs. In some examples, residual samples corresponding to a CU are subdivided into smaller units using a quadtree structure known as "residual quad tree" (RQT). The leaf nodes of the RQT can be referred to as transform units (TUs). Pixel difference values associated with the TUs are transformed to produce transform coefficients, which are quantized, in some examples.

A PU includes data related to the prediction process. For example, when the PU is intra-mode encoded, the PU includes data describing an intra-prediction mode for the PU. As another example, when the PU is inter-mode encoded, the PU includes data defining a motion vector for the PU. The data defining the motion vector for a PU describes, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

As an example, the HM supports prediction in various PU sizes. Assuming that the size of a particular CU is 2N×2N, the HM supports intra prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-predictive or inter-predictive coding, video encoder 20 calculates residual data for the TUs of the CU, in HEVC or for macroblock in H.264. The PUs comprise pixel data in the spatial domain (also referred to as the pixel domain) and the TUs comprise coefficients in the transform domain following application of a transform (e.g., a discrete cosine transform (DCT)), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 26 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, in 3D-HEVC, video encoder 20 and video decoder 30 may inter-predict a current block within a current picture of a first view with reference to a reference block within a reference picture of a second view. Such inter-prediction is referred to as inter-view prediction. The time instance of the current picture and the reference picture may be the same in respective views. In this example, video encoder 20 or video decoder 30 perform inter-view prediction across pictures in a same access unit, where pictures in the same access unit are at the same time instance.

To perform inter-view prediction on the current block, video encoder 20 or video decoder 30 construct reference picture lists that identify reference pictures that can be used for inter-prediction, including pictures that can be used for inter-view prediction. Inter-prediction refers to predicting a current block in a current picture with respect to a reference block in a reference picture. Inter-view prediction is a subset of inter-prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists. As used in this disclosure, when video encoder 20 is performing inter-prediction (e.g., inter-predicting) on a block, video encoder 20 may be considered as inter-prediction encoding a block. When video decoder 30 is performing inter-prediction (e.g., inter-predicting) on a block, video decoder 30 may be considered as inter-prediction decoding a block.

In inter-prediction, a motion vector for the current block identifies a location of the block that is to be used as the reference block for inter-predicting the current block, and a reference index into one or both of the constructed reference picture lists identifies the reference picture that includes the block that is be used as the reference block for inter-predicting the current block. In MVC, there are at least two types of motion vectors. A temporal motion vector refers to a temporal reference picture, where a temporal reference picture is a picture within the same view as the picture that includes the block to be predicted, and where the temporal reference picture is displayed earlier or later than the picture that includes the block to be predicted. A disparity motion vector refers to a reference picture in a view other than the view in which the picture that includes the block to be predicted. When video encoder 20 or video decoder 30 utilizes temporal motion vectors, video encoder 20 and video decoder 30 are considered as implementing motion-compensated prediction (MCP). When video encoder 20 or video decoder 30 utilizes disparity motion vectors, video encoder 20 and video decoder 30 are considered as implementing disparity-compensated prediction (DCP), or inter-view prediction.

This disclosure describes techniques for determining a disparity vector for a current block based on motion information (e.g. a disparity motion vector) of spatial and/or temporal neighboring blocks. In other words, a disparity vector for a current block may be determined by analyzing the motion vectors of one or more spatial and/or temporal neighboring blocks that are coded with DCP. The techniques of this disclosure may be implemented by one or both of video encoder 20 and video decoder 30. These techniques may, for example, be used in conjunction with HEVC-based multiview video coding and/or HEVC-based 3D video coding.

Figure 4:
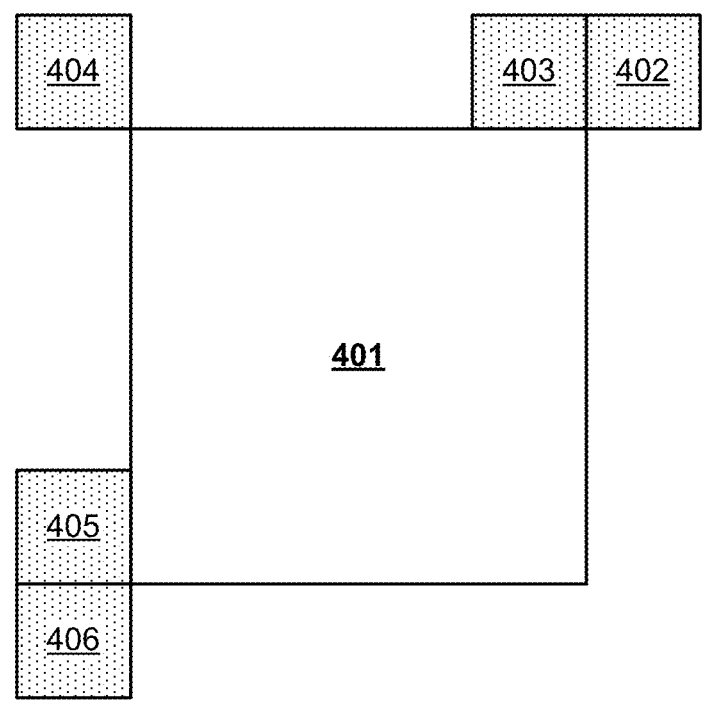
FIG. 4 shows an example of a current block and five spatial neighboring blocks.

FIG. 4 shows an example of a current block 401 and five spatial neighboring blocks (402, 403, 404, 405, and 406). In single view video coding, motion information of the five spatial neighbors may be used, for example, to construct an AMVP/merge mode candidate list for merge mode or AMVP. Additionally, a temporal neighbor of block 401 may also be used to construct these candidate lists. The temporal neighbor (not shown in FIG. 4) may, for example, be a co-located block in a picture of a different temporal instance. In multiview coding, the motion information of spatial neighbors and temporal neighbors can be used to generate the AMVP/merge mode candidate list as in single view coding, but in multiview video coding temporal neighboring blocks may also be found in any reference pictures, including temporal reference pictures of the same view and an inter-view reference picture of a second view. As mentioned above, these pictures of the second view can be used to predict blocks of video data in a first view using a disparity motion vector. According to the techniques of this disclosure, motion information of the five spatial neighboring blocks shown in FIG. 4 as well as motion information of temporal neighboring blocks may be used to determine disparity vectors for a current block of a current picture (e.g. block 401 in FIG. 4).

As will be made clear in the description below, which spatial neighboring blocks and which temporal neighboring blocks are used for determining a disparity vector for the current block can be derived in a flexible manner. A disparity vector for the current block may also be derived in a fixed manner for a given multiview codec. The one or more spatial neighboring blocks comprise spatial neighboring blocks which are to be accessed by existing coding tools in two-dimensional (2D) video codecs. In some implementations, the spatial neighboring blocks considered and the order in which the neighboring blocks are considered may be the same as the spatial neighboring blocks for deriving a candidate list as part of an AMVP process defined in HEVC, or be the same as the spatial neighboring blocks for deriving a candidate list for as part of a merge process defined in HEVC. As one example, referring back to FIG. 4 when constructing a candidate list for merge or AMVP, video encoder 20 and video decoder may consider the candidates in the order of block 405 first, then block 403, then block 402, then block 406, and finally block 404.

The techniques of this disclosure, however, do not exclude the flexibility of choosing which order or which combination of methods are used to identify the disparity motion vectors of the neighboring blocks to form a final disparity vector for a particular multiview codec. Thus, the neighboring blocks used in conjunction with the techniques of this disclosure need not necessarily be the same blocks shown in FIGS. 4-7 and need not necessarily be the same blocks used to derive an AMVP/merge mode candidate list for AMVP or merge mode. Accordingly, the order in which the neighboring blocks are considered need not necessarily be the same order used in the examples of this disclosure and need not necessarily be the same order in which neighboring blocks are considered for deriving an AMVP/merge mode candidate list. Additionally, although the examples of 2D coding tools given above are HEVC coding tools, it is contemplated that the block ordering used by non-HEVC coding tools may also be used in conjunction with the techniques of this disclosure.

In FIG. 4, a luma location (xP, yP) specifies the top-left luma sample of block 401 relative to the top-left sample of the current picture that includes block 401. Accordingly, the top-left luma same of a current block, referred to in this examples as PU "N", relative to the top-left sample of the current picture is (xN, yN). Variables nPSW and nPSH denote the width and height of block 401 for luma. In this example, (xN, yN), with N being replaced by 406, 405, 404, 403, and 402 to identify one of blocks 402-406 is defined as (xP−1, yP+nPSH), (xP−1, yP+nPSH−1), (xP+nPSW, yP−1), (xP+nPSW−1, yP−1) or (xP−1, yP−1), respectively. In this manner, video decoder 30 determines the location of the spatially neighboring blocks. According to the techniques of this disclosure, motion information of these spatially neighboring blocks (e.g. blocks 402-406) can be evaluated as part of determining a disparity vector for block 401.

The following description explains ways in which video encoder 20 or video decoder 30 can identify temporal neighboring blocks. If those temporal neighboring blocks were coded using DCP, then the disparity motion vectors used to code the temporal neighboring blocks may be used to determine a disparity vector for the current block. Video encoder 20 and video decoder 30 may identify temporal neighboring blocks by first identifying temporal pictures, and then within the identified temporal pictures, identifying co-located or neighboring blocks. Multiple temporal pictures may be identified, and thus, multiple temporal neighboring blocks may also be identified.

In one example, the same picture used for temporal motion vector prediction in HEVC may be used as a temporal picture for identifying a temporal neighboring block in accordance with the techniques of this disclosure. The picture used for temporal motion vector prediction in HEVC may be indicated by the collocated_ref_idx index value in one of the reference picture lists for the picture that includes current block to be inter-predicted. The collocated_ref_idx index value may identify a picture in the same view as the picture that includes the block to be inter-predicted, or a picture in a different view as the picture that includes the block to be inter-predicted. In either of these examples, the picture identified by the collocated_ref_idx index value may include one or more temporally neighboring blocks. Video encoder 20 signals a flag (e.g., collocated_from_l0_flag) that indicates whether the co-located picture is identified in RefPicList0 or RefPicList1. For example, if the flag value is 1, then video decoder 30 determines that the co-located picture is identified in RefPicList0, and if the flag value is 0, then video decoder 30 determine that the co-located picture is identified in RefPicList1.

A temporal picture, however, is not limited to being the same picture used for temporal motion vector prediction in HEVC. A temporal picture can be any picture in the decoded picture buffer. A temporal picture typically refers to a picture in the reference picture lists of the current picture or in the decoded picture buffer that belongs to the same view as the current picture. In some cases a temporal picture can also be an inter-view reference picture of the current picture. For example, temporal pictures may include all entries or a subset of entries of reference picture list 0 (RefPicList0) if the current slice is inter-coded and may include all entries or a subset of entries of RefPicList0 and RefPicList1 if the current slice is coded as a B slice.

As an example, video encoder 20 and video decoder 30 may be configured to identify temporal neighboring blocks only in the first reference picture of RefPicList0 and/or RefPicList 1. In other examples, video encoder 20 and video decoder 30 may also be configured identify temporal neighboring blocks in the first two reference pictures of RefPicList0 and/or RefPicList 1 or in some selected ordering or subset of the pictures in of RefPicList0 and/or RefPicList 1. Additionally, in some examples, video encoder 20 and video decoder 30 may identify temporal neighboring blocks in an inter-view picture of the same access unit of the current picture even if the inter-view picture of the same access unit is not included in either of RefPicList0 or RefPicList 1.

Once video encoder 20 and video decoder 30 identify the temporal pictures using one or more of the techniques described above, video encoder 20 and video decoder 30 can identify one or more temporal neighboring blocks in the temporal pictures. Video encoder 20 and video decoder 30 may, for example, identify as a temporal neighboring block the co-located block in the temporal picture. A co-located block generally refers to a block that has the same relative location in a temporal picture as the current block has in a current picture. Video encoder 20 and video decoder 30 may also identify as temporal neighboring blocks any block that is or belongs to a PU of the CU that contains the co-located block. In some examples, video encoder 20 and video decoder 30 may identify as temporal neighboring blocks any block that is or belongs to a PU of the LCU that contains the co-located block. The examples provided in this disclosure for determining temporal pictures and temporal neighboring blocks in the temporal pictures are not intended to constitute an exhaustive list of all the ways in which temporal neighboring blocks may be identified. The techniques of this disclosure for determining a disparity vector for a current block are generally compatible with any techniques for determining temporal neighboring blocks for the current block.

This disclosure describes techniques for using disparity motion vectors associated with spatial neighboring blocks (e.g. blocks 402-406) and disparity motion vectors associated with temporally neighboring blocks to determine a disparity vector for a block being coded (e.g. block 401). Using the disparity motion vectors of spatial neighboring blocks 402-406 and one or more temporal neighboring blocks, candidate disparity vectors can be identified and stored in the list disVecCan. As will be described in more detail below, one or more final disparity vectors used to identify a reference block for inter-view prediction (e.g. inter-view motion prediction or inter-view residual prediction) can be determined from the candidates in disVecCan.

As will be explained in greater detail below, candidates for inclusion in disVecCan may be determined by identifying SDVs, TDVs, and by determining implicit disparity vectors IDVs. SDVs, TDVs, and IDVs will now be explained in greater detail.

Figure 5:
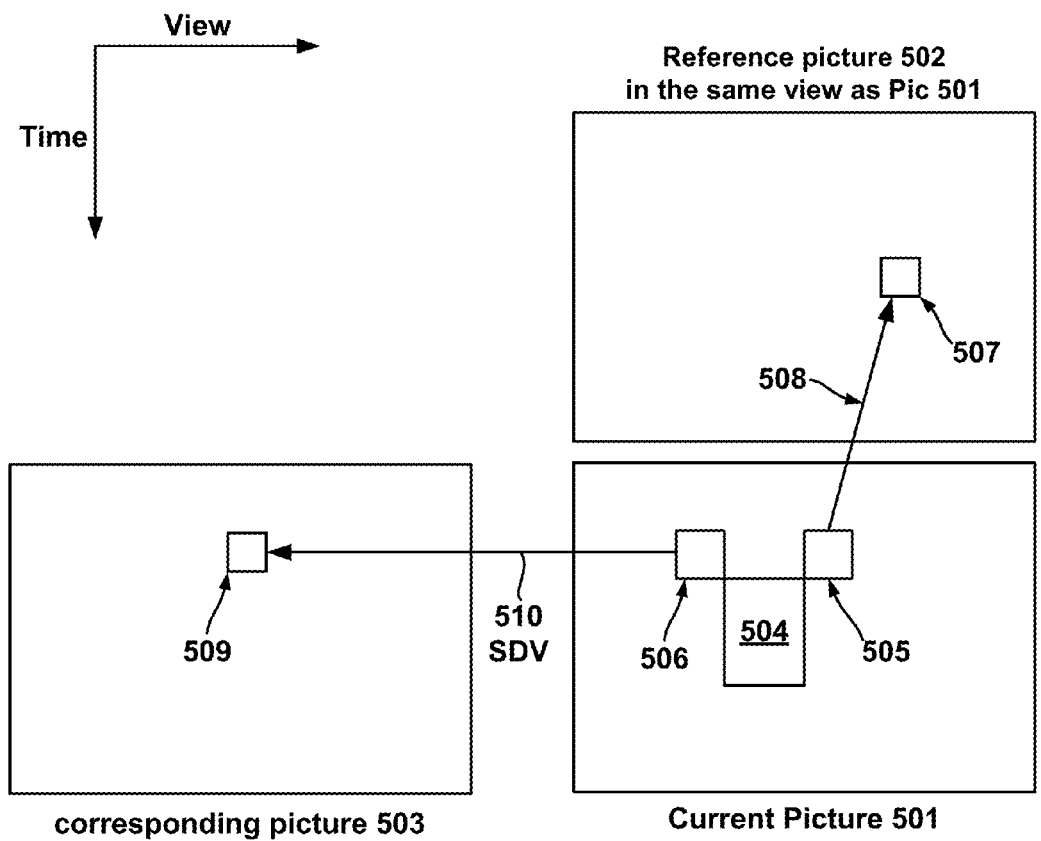
FIG. 5 shows a conceptual illustration of a spatial disparity vector (SDV).

FIG. 5 is a conceptual diagram illustrating an SDV. FIG. 5 shows three pictures, current picture 501, reference picture 502, and corresponding picture 503. Current picture 501 represents a picture currently being coded. Reference picture 502 represents an already coded picture that is from the same view as current picture 501, and corresponding picture 503 represents the picture that corresponds to the same temporal instance as current picture 501 in the other view. Current picture 501 includes current block 504, which is a block currently being coded. Current block 504 has two spatial neighbors (block 505 and block 506) that have already been coded. For current block 504, its two spatial neighbors (block 505 and block 506) are coded with MCP and DCP, respectively. In the example of FIG. 5, block 505 is coded using MCP, and block 507 represents the block used to predict block 505. Line 508 represents the temporal motion vector used to identify block 507.

In the example of FIG. 5, block 506 is coded using DCP instead of MCP. Block 506 is predicted from block 509, which is in a different view than block 506. Therefore, the motion vector used to locate the reference block (i.e. block 509) for block 506 is a disparity motion vector instead of a temporal motion vector. Line 510 represents the disparity motion vector used to locate block 509. In the example of FIG. 5, line 510 represents an SDV for block 504. In some implementations, the SDV may be used as a disparity vector for current block 504. In other implementations, the SDV may be added to disVecCan for current block 504, and a disparity vector for current block 504 can be selected from the candidates in disVecCan.

To determine SDVs, video encoder 20 and video decoder 30 can check each spatial neighboring prediction unit of current block 504 in a given order. Current block 504 may have more spatial neighboring prediction units than just 505 and 506 shown in FIG. 5. FIG. 4, for instance, shows examples of other spatial neighboring blocks. For each of the spatial neighboring PUs of current block 504, a forward motion vector (corresponding to RefPicList0) or a backward motion vector (corresponding to RefPicList1), if available, can be checked and added to the disVecCan if the motion vector is a disparity motion vector. Referring back to FIG. 5, for example, the motion vector represented by line 510 constitutes an SDV for block 504 because it is a disparity motion vector, while the motion vector represented by line 508 does not constitute an SDV because it is a temporal motion vector.

Figure 6:
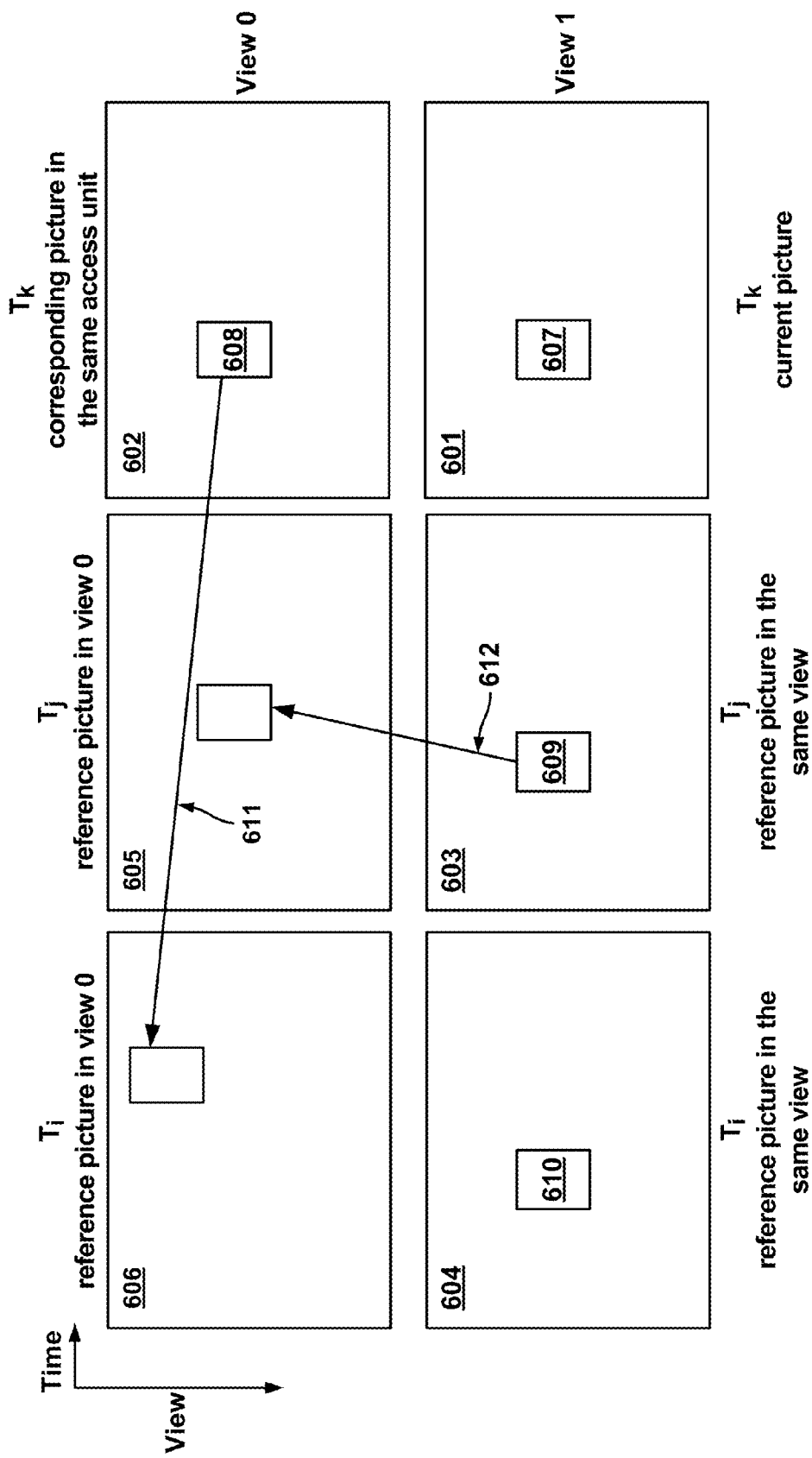
FIG. 6 shows a conceptual illustration of a temporal disparity vector (TDV).

FIG. 6 shows a conceptual illustration of a TDV. FIG. 6 shows six pictures. Current picture 601 represents a picture currently being coded. Corresponding picture 602 represents a picture that is of the same temporal instance as current picture 601 but in a different view (view 0 in FIG. 6). Reference pictures 603 and 604 represent reference pictures that are in the same view (i.e. view 1) as current picture 601, and reference pictures 605 and 606 represent reference pictures that are in the same view (i.e. view 0) as corresponding picture 602. In the example of FIG. 6, reference picture 604 and reference picture 606 are pictures of the same temporal instance, and reference picture 603 and reference picture 605 are pictures of the same temporal instance.

Current picture 601 includes a current block 607 currently being coded. There are three reference pictures for current block 607, two from the same view (reference picture 603 and reference picture 604 in view 1) and one from the other view (reference picture 602 in view 0). Three temporal neighboring blocks (608, 609, and 610) can be checked to determine if they use a disparity motion vector. Blocks 608, 609, and 610 are considered temporal neighbors of block 607 because they are co-located to block 607, meaning they are in the same approximate location as block 607 but in different pictures.

In the example of FIG. 6, temporal neighboring block 610 is intra predicted and does not have an associated motion vector. Temporal neighboring block 608 is inter predicted using a temporal motion vector, represented in FIG. 6 by line 611. Temporal neighboring block 609 is inter-view predicted using a disparity motion vector represented by line 612. Thus, in the example of FIG. 6, only temporal neighboring block 609 is predicted using a disparity motion vector. Therefore, only the motion vector of block 609 is used as a TDV candidate. The TDV candidate may either be used as disparity vector for the current block or may be added as a candidate disparity vector to disVecCan, from which a disparity vector for the current block is selected.

Video encoder 20 and video decoder 30 may identify, for use as a TDV, the disparity motion vector of a co-located PU of the first reference picture of reference picture list 0 or reference picture list 1. Video encoder 20 and video decoder 30 may also identify, for use as a TDV, the disparity motion vector of the co-located PU from the picture used for TMVP or the block derived by TMVP. Video encoder 20 and video decoder 30 may also identify, for use as a TDV, the disparity motion vector of the co-located PU of any reference picture of either reference picture list, which may or may not be an inter-view reference picture. In some instances, video encoder 20 and video decoder 30 may also identify, for use as a TDV, the disparity motion vector of blocks in an inter-view picture of the same access unit which is not included in the reference picture lists. In addition, video encoder 20 and video decoder 30 may, for use as a TDV, the disparity motion vector of any PU of the CU containing the co-located PU of any of the above mentioned pictures or the disparity motion vector of any PU of the LCU containing the co-located PU of any of the above-mentioned pictures.

Implicit disparity vectors (IDVs) refer to stored disparity vectors of the neighboring blocks of the current block. After coding a current block, if the disparity vector is used for inter-view prediction, that is, at least one of its motion vectors predicted from inter-view motion parameter prediction, the disparity vector is stored for the current block. When coding a block in the future, the previously stored disparity vectors are used to predict the disparity vector. When checking such previously disparity vectors, also only neighboring blocks may be checked. This means that disparity vectors of spatial neighboring blocks (as those containing SDVs) are IDVs, or the disparity vectors of the temporal neighboring blocks (as those containing TDVs) are considered as IDVs, or disparity vectors of both spatial and temporal neighboring blocks are considered as IDVs. The described techniques may work with or without considering IDVs.

If a PU is coded with at least one of its motion vectors predicted from inter-view motion parameter prediction, i.e., derived from other views based on a disparity vector, the disparity vector may be temporally associated with the PU. The disparity vector associated with such a PU is referred to as an IDV. When a spatial or temporal neighboring PU of the current PU is contains an IDV, the IDV can be considered for use to derive the disparity vector for the current block. That is, an IDV of a spatial or temporal neighbor PU can be treated as an IDV candidate. The IDV candidate may either be used as a disparity vector for the current block or may be added as a candidate disparity vector to disVecCan, from which a disparity vector for the current block is selected.

Figure 7:
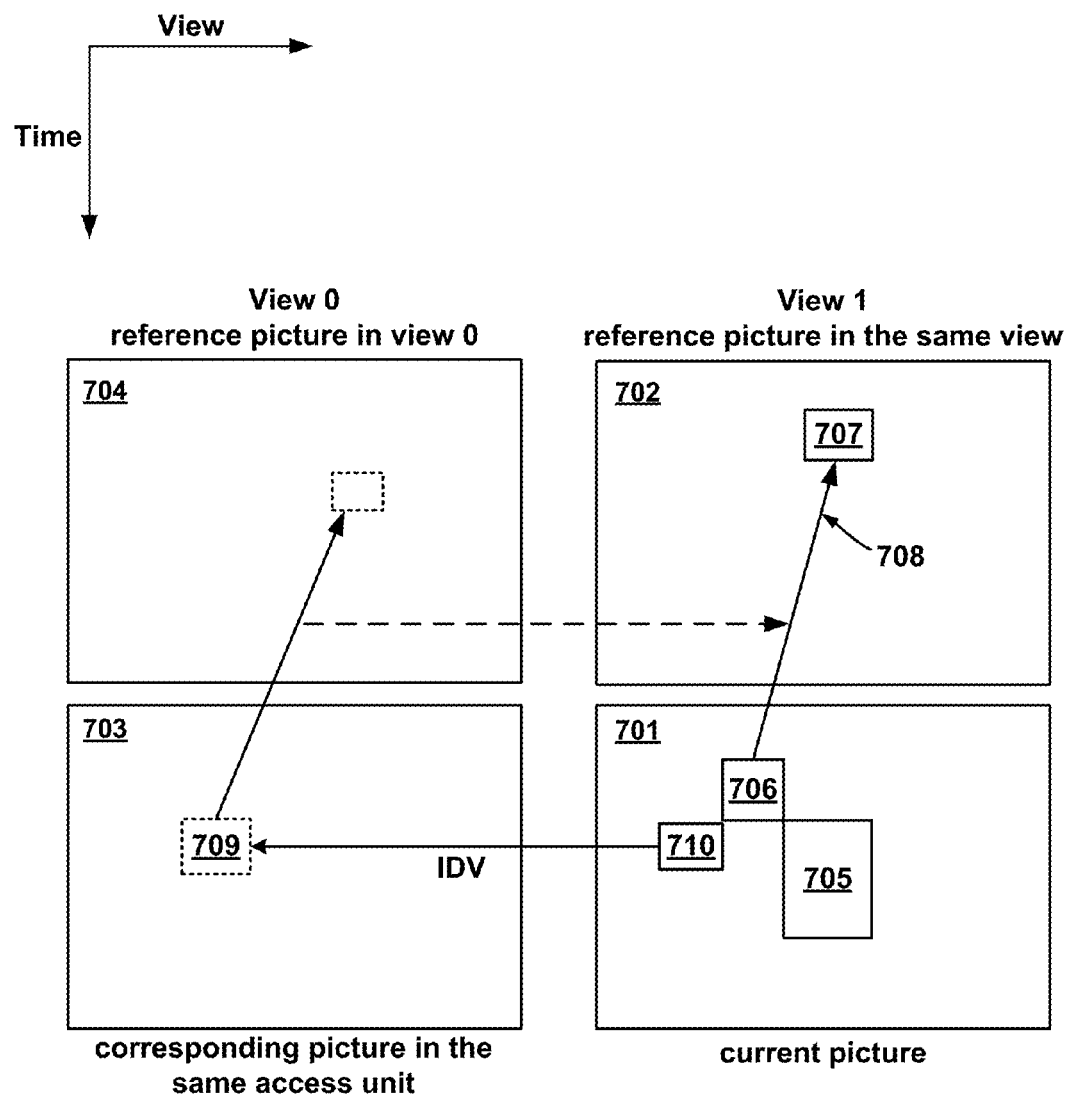
FIG. 7 shows a conceptual illustration of an implicit disparity vector (IDV).

FIG. 7 shows a conceptual illustration of an IDV. In particular, FIG. 7 shows four pictures. Current picture 701 represents a picture currently being coded. Picture 702 represents a reference picture in the same view (view 1) as picture 701. Corresponding picture 703 represents a picture of the same temporal instance as current picture 701 but in a different view (view 0). Picture 704 represents a reference picture in the same view (view 0) as picture 703. In the example of FIG. 6, picture 701 includes a current PU 705. Current PU 705 has a spatial neighbor (PU 706) that is predicted from block 707 in reference picture 702 in the same view (view 1). The motion vector used to predict PU 706 is represented by line 708. In the example of FIG. 7, this motion vector (line 708) is inherited from PU 709. PU 709 is located by the disparity vector of PU 710, which is a spatial neighboring PU of PU 706. In this case, PU 706 is a PU that is associated with an IDV, and the disparity vector of PU 710 is treated as an IDV.

Given a target reference view, a disparity vector may be determined from the available SDV, TDV or IDV vectors described above. As will be described in more detail, in one example, a certain order may be followed and once a disparity motion vector is identified as available, then the disparity motion vector can be used as the disparity vector for a current block. In some implementations, if the identified reference view, which is the view containing the reference picture identified by the reference index corresponding to the disparity motion vector, is in the same view as that of the target reference view, meaning once the current checking SDV, TDV, or IDV is available, the disparity vector is identified. In another example, however, the identified reference view (e.g., the view identifier or view order index) can be part of the output of disparity vector derivation process. As will be explained in more detail below, in some implementations, the derivation process may return a disparity vector that is not restricted by a given target reference view, while in other implementations the returned disparity vector may be restricted by the target reference view.

To determine TDVs, video encoder 20 and video decoder 30 can be configured to implement any of a variety of different processes. For example, video encoder 20 and video decoder 30 may be configured to check each picture of each reference picture list. The order in which video 20 can either be to check reference picture list index (RefPicList0 or RefPicList1) first or to check reference index first. The motion vector of the co-located PU or any PU of the CU/LCU containing the co-located PU in the picture can also be checked. If a motion vector is a disparity motion vector, it can be used as a TDV and can either be used as a disparity vector for the current block or can be added to disVecCan. As discussed above, disVecCan represents an example of a data structure including candidate disparity vectors. Moreover, the video coder may select a disparity vector for the current block from disVecCan, using the techniques of this disclosure.

Video encoder 20 and video decoder 30 may also be configured to check an inter-view picture of the same access unit even included in the reference picture lists, the motion vector of the co-located PU, or any PU of the CU/LCU containing the co-located PU in the picture, if it is a disparity motion vector, it can be used as a TDV. Motion vector of which is not. Video encoder 20 and video decoder 30 may also be configured to check only the TMVP, as defined in HEVC, and if it is a disparity motion vector, it can be used as a TDV. Video encoder 20 and video decoder 30 may also be configured to check only the co-located PU from the picture used for TMVP, as defined in HEVC, and if any of its motion vector (corresponding to either RefPicList0 or RefPicList1) are a disparity motion vector, then the disparity motion vector can be used as a TDV.

Check only the TMVP, as defined in HEVC, and if it is a disparity motion vector, it is added into the disVecCan.

Check only the co-located PU from the picture used for TMVP, as defined in HEVC, if any of its motion vector (corresponding to either RefPicList0 or RefPicList1) it is a disparity motion vector, it is added into the disVecCan.

What candidates are added to disVecCan and what candidates are excluded from disVecCan may vary for different implementations of the techniques of this disclosure. For example, in some implementations a candidate disparity vector that points to a target reference view that is different than a target view for a current block may be excluded from disVecCan, while in other implementations such a candidate may be included. In some implementations, a candidate disparity vector that points to a target reference view that is different than a target view for a current block may be scaled prior to being added to disVecCan, while in other implementations only unscaled candidates are included in disVecCan.

After SDVs, TDVs, and IDVs are determined for inclusion in disVecCan, video encoder 20 and video decoder 30 may derive a disparity vector for a current block from the candidates in disVecCan. For example, video encoder 20 and video decoder 30 may be configured to select the candidate from disVecCan which has the highest frequency of occurrence. In other words, video encoder 20 and video decoder 30 may select the candidate disparity vector in disVecCan that occurs most frequently as the disparity vector for the current block. In instances where more than one candidate disparity occur with the same frequency, video encoder 20 and video decoder 30 may, for example, be configured to select the candidate disparity vector based on the order in which the candidate disparity vectors were added to disVecCan. For example, of the disparity vector candidates in disVecCan that occur most frequently, the disparity vector candidate first added to disVecCan may be selected as the disparity vector for the current block.

In some implementations, rather than determining a disparity vector based on multiple candidates in disVecCan, a video coder may use the first available candidate disparity motion vector as the disparity vector for the current block. For example, video encoder 20 and video decoder 20 may evaluate a plurality of neighboring blocks to determine if one of the plurality of neighboring blocks produces an available candidate disparity vector and terminate the evaluating of neighboring blocks upon identifying an available candidate disparity vector.

The first available candidate may, for example, be dependent on what is considered to be an available candidate. For example, in some implementations, the disparity vector derivation process can return a disparity vector that is not restricted by the given target reference view, meaning that a disparity vector can be considered as available regardless of the view to which it refers. That is, in some implementations, a disparity motion vector pointing to a target view that is different than a target reference view of a current block may be considered to be unavailable, whereas in other implementations such a disparity motion vector may be considered to be an available candidate. An available candidate generally refers to a candidate that meets the criteria for being used as a disparity vector for the current block. This criteria can vary for different implementations of the techniques of this disclosure. Thus, what constitutes an available candidate need not be fixed, but instead can vary for different implementations of the techniques of this disclosure.

The derivation process can return a disparity vector that is not restricted by the given target reference view, meaning that a disparity vector is considered as available regardless of the view to which it refers. The derived disparity vector may be used directly used as the derived disparity vector. In another example, the disparity vector is not restricted by the given target reference view. In this case, the identified reference view can be part of the outputs of the disparity derivation process as describe in this disclosure. However, if an identified reference view is not the target reference view, is the derived disparity vector can be converted to a disparity vector referring to the target reference view, and the vector may be scaled based on e.g., the view identifier differences or camera locations. An available candidate disparity vector may be directly used as the derived disparity vector for a current block. In some examples, however, if the identified reference view for the available candidate disparity vector is not the target reference view of the current block, then the available candidate disparity vector is converted to a disparity vector referring to the target reference view, for example by scaling the candidate disparity vector based on e.g., the view identifier differences or camera locations.

The first available candidate may, for example, also be dependent on the order in which candidates are evaluated. In one example, spatial neighboring blocks may first be evaluated to identify an SDV. If an SDV is not identified, then one or more temporal neighboring blocks may be evaluated to identify a TDV, and if no TDV is identified, then spatial and temporal neighbor blocks may be evaluated again to determine an IDV. This of course merely represents one order of evaluation, and other orders can be used.

When evaluating spatial neighboring blocks, the spatial neighbors may also be evaluated in a defined order. For example, referring back to FIG. 4, the video coder may evaluate the spatial neighboring blocks in the following order: (1) block 405, (2) block 403, (3) block 402, (4) block 406, (5) block 404. Using this example ordering, video encoder 20 and video encoder 30 may first evaluate neighboring block 405 to determine if an SDV is available. If neighboring block 405 does not have an associated SDV, then video encoder 20 and video encoder 30 may next evaluate block 403 to determine if an SDV is available. If neighboring block 403 does not have an associated SDV, then video encoder 20 and video encoder 30 may next evaluate block 402, and this process can repeat until video encoder 20 and video decoder 30 identify an available SDV or until all spatial neighbors have been evaluated. If all of neighboring blocks 402-406 are evaluated and no available SDV is identified, then video encoder 20 and video encoder 30 may next evaluate one or more temporal neighboring blocks to identify an available TDV. If no available TDVs are identified, then video encoder 20 and video encoder 30 may evaluate spatial neighboring blocks 402-406 and temporal neighboring blocks again to identify an available IDV. When neighboring blocks 402-406 and temporal neighboring blocks are evaluated to determine an available IDV, neighboring blocks 402-406 may be evaluated in the same order used for identifying SDVs and TDVs or a different order may be used. Additionally, different groups of neighboring blocks may be used for identifying SDVs, TDVs, and IDVs. For example, only a subset of blocks evaluated for identifying an SDV may be evaluated for identifying IDVs, or vice versa. Other defined orders could also be used. For example, the order in which the categories are checked may be any of (1) SDV vectors, (2) TDV vectors, (3) IDV vectors; (1) SDV vectors, (2) IDV vectors, (3) TDV vectors; (1) IDV vectors, (2) SDV vectors, (3) TDV vectors, or some other ordering. Additionally, in some implementations, one or two of the above mentioned categories of disparity motion vectors may not be considered and checked.

In some implementations, a video coder may interleave the evaluating of the spatial and temporal neighboring blocks. For example, referring back to FIG. 4, the video coder may evaluate the neighboring blocks in the following order: (1) block 405, (2) block 403, (3) block 402, (4) block 406, (5) first temporal neighboring block, (6) second temporal neighboring block, (7) block 404. Again, this order of evaluation represents one of many examples, and other orders can be used. Regardless of what order is used, video encoder 20 and video decoder 30 will typically be configured to implement the same ordering such that video encoder 20 and video decoder 30 are configured to identify the same disparity vector candidate and/or generate the same disVecCan.

Regardless of whether a disparity vector is determined from a first available candidate or is determined based on multiple candidates in disVecCan, the disparity vector may be quantized, for example, to integer/4-pixel accuracy. In implementations where a disparity vector is selected from multiple candidates in disVecCan, each candidate may be quantized prior to being added to disVecCan, or a candidate may be selected from disVecCan and then quantized. Additionally, in instances where a motion vector used to determine a disparity vector has a y-component other than zero, the y-component of a disparity vector may be set equal to zero. For purposes of example, assume a disparity motion vector used to predict a spatial neighboring block of a current block has a non-zero y-component, and that disparity motion vector is to be used to determine the disparity vector for the current block. In some instances, the disparity motion vector with the non-zero component may be used as the disparity vector, meaning the disparity motion vector of the neighboring block and the disparity vector of the current block will have both the same x-components and the same y-components. In other instances, however, the y-component of the disparity motion vector may be set to zero, meaning the disparity motion vector of the neighboring block and the disparity vector of the current block will have the same x-components but will have different y-components.

A disparity vector derived using one of the above mentioned techniques can be used for all coding tools that may require a disparity vector. For example, the disparity vector can be used for inter-view motion prediction and inter-view residual prediction, although other coding tools can potentially use the disparity vector as well. The disparity vector can be used to identify a reference block of the reference view such that the information of the reference block can be used to predict the current block. In inter-view motion prediction, the disparity vector be used, for example, for two purposes, to get motion vector predictors from the reference view or to convert the disparity vector itself to a motion vector predictor. When a reference block is identified by the disparity vector, the motion vector belonging to the reference block may be used to create a new motion vector candidate to be considered as a new entry of a merge or AMVP candidate list for the current block. Also, the disparity vector can be converted to a (disparity) motion vector, which can be another merge or AMVP candidate. The additional merge or AMVP candidate may be added, for example, with pruning methods. The disparity vector derivation process as described in this disclosure, works in general for different methods of inter-view motion prediction. Inter-view residual prediction uses the residual produced in the reference block of the reference view to further predict the residual data of the current block. Here, the disparity vector is used to identify the reference block.

Inter-view residual prediction uses the residual produced in the reference block of the reference view to further predict the residual of the current block. In such instances, the disparity vector is used to identify the reference block. The preceding examples have been given solely for purposes of illustration, and a disparity vector determined according to techniques of this disclosure may be used in a variety of other manners to implement inter-view motion prediction, inter-view residual prediction, or other coding techniques.

Figure 8:
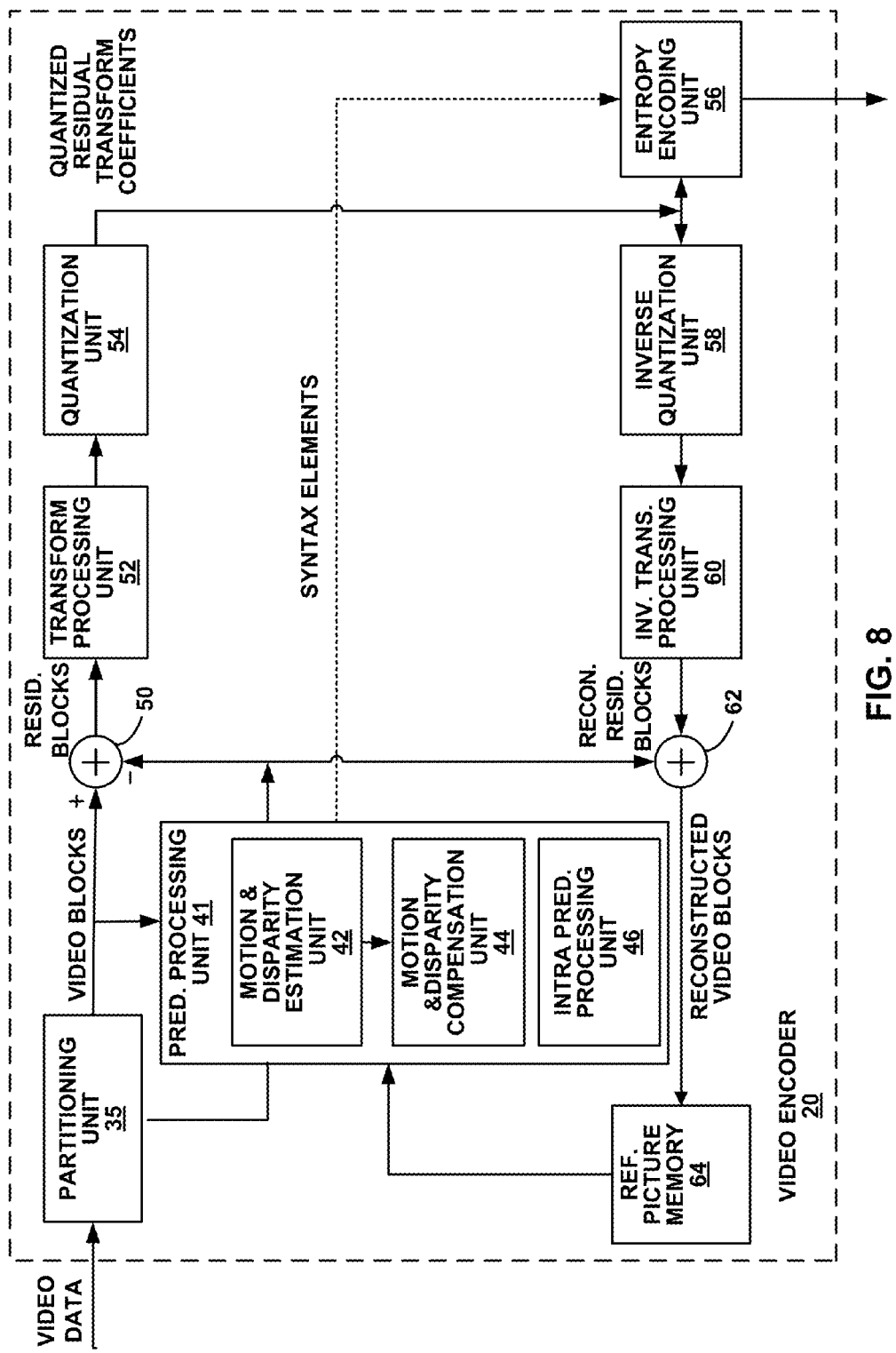
FIG. 8 is a block diagram illustrating an example video encoder that may implement the techniques described in this disclosure.

FIG. 8 is a block diagram illustrating an example video encoder 20 that may implement the techniques described in this disclosure. Video encoder 20 may perform intra and inter coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes a partitioning unit 35, prediction processing unit 41, reference picture memory 64, summer 50, transform processing unit 52, quantization unit 54, and entropy encoding unit 56. Prediction processing unit 41 includes motion and disparity estimation unit 42, motion and disparity compensation unit 44, and intra-prediction processing unit 46. For video block reconstruction, video encoder 20 also includes inverse quantization unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 8, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures and/or reference views to provide temporal compression.

Motion and disparity estimation unit 42 may be configured to determine the inter-prediction mode and/or interview prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion and disparity estimation unit 42 sends the calculated motion vector and/or disparity vector to entropy encoding unit 56 and motion compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

Motion and disparity compensation unit 44 may use various modes for signaling motion information in an encoded bitstream, and in order to reduce the number of bits needed to implement inter-predictive coding, some of those modes may utilize prediction of motion parameters instead of explicit signaling of motion parameters. In the developing HEVC standard, there are two modes for the prediction of motion parameters. One is merge mode and the other is advanced motion vector prediction (AMVP). In merge mode, motion and disparity compensation unit 44 constructs a candidate list of motion parameters (reference pictures and motion vectors) using candidates from spatial and temporal neighboring blocks. The chosen motion parameters are signaled from encoder 20 to decoder 30 by transmitting an index of the selected candidate from the candidate list. At decoder 30, once the index is decoded, all the motion parameters of the corresponding block of the selected candidate are inherited. Encoder 20 and decoder 30 are configured to construct the same lists based on already coded blocks. Therefore, based on the index, video decoder 30 can identify the motion information of the candidate selected by encoder 20. The motion information typically includes a reference index and a motion vector for each prediction unit in each prediction direction, corresponding to a reference picture list 0 or reference picture list 1.

In AMVP, motion and disparity compensation unit 44 constructs a candidate list of motion vector predictors. This list includes, for example, motion vectors of neighboring blocks that are associated with the same reference index as well as a temporal motion vector predictor which is derived based on the motion parameters of the neighboring block of the co-located block in a temporal reference picture. Similar to merge mode described above, encoder 20 signals the chosen motion vector to decoder 30 by transmitting an index of the selected candidate. Additionally, encoder 20 also signals motion vector differences, where the motion vector difference is a difference between the motion vector predictor and the actual motion vector to be used to predict a current block.

For some blocks, prediction processing unit 41 may select an intra-prediction mode instead of an inter-prediction mode. Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied by transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

In this manner, video encoder 20 represents an example of a video encoder configured to encode one or more pictures in one or more reference views, including a first reference view and determine a disparity vector for a current block based on motion information of one or more neighboring blocks of the current block. The current block is in a second view, and the disparity vector points from the current block to a corresponding block in a picture of the same time instance in one of the one or more reference views. The motion information of one of the one or more neighboring blocks may include a motion vector, and in response to determining the motion vector is associated with a reference index corresponding to a reference picture belonging to one of the one or more reference views, video encoder 20 may consider the motion vector to be a disparity motion vector and utilize the disparity motion vector to derive the disparity vector according to techniques described in this disclosure.

Figure 9:
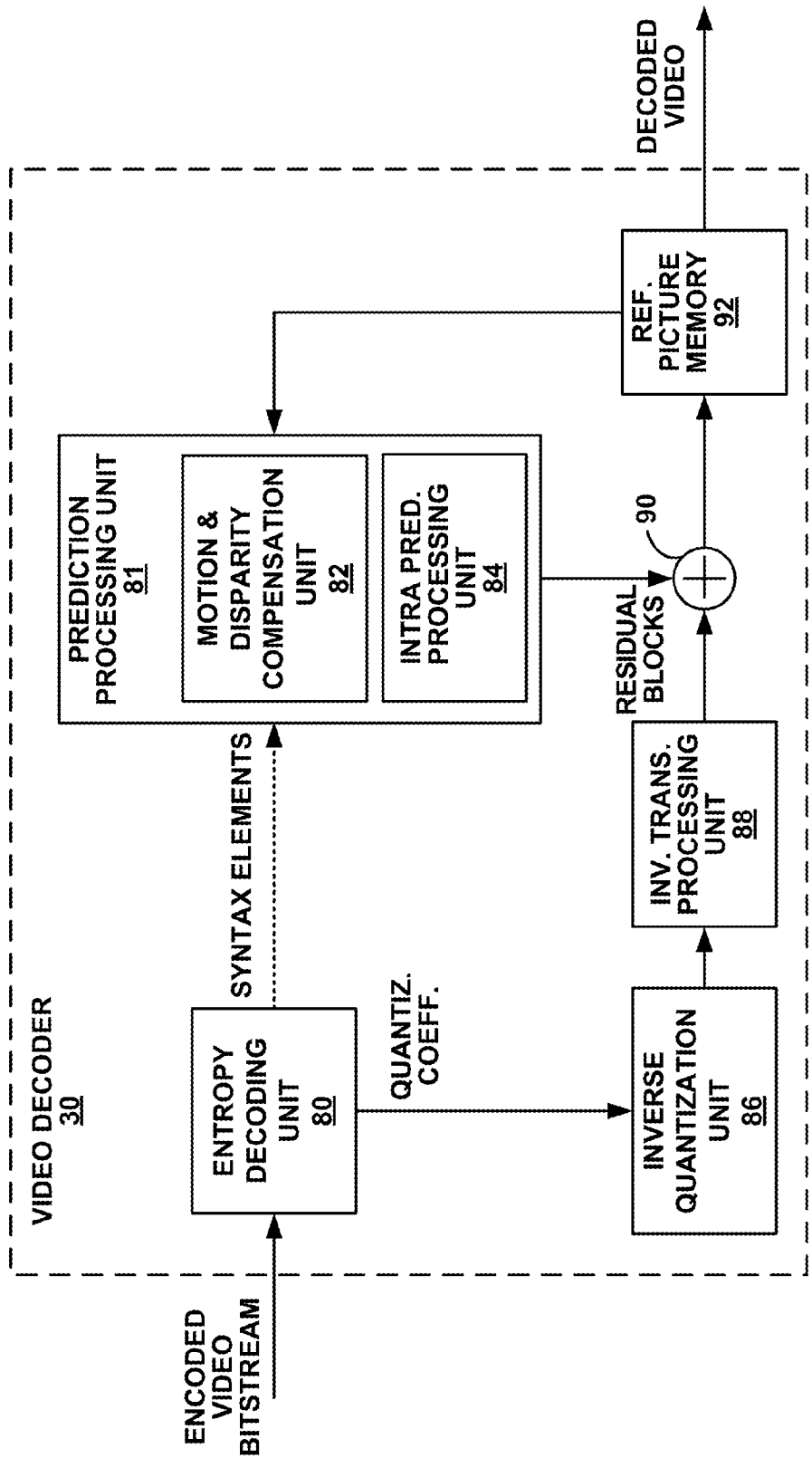
FIG. 9 is a block diagram illustrating an example video decoder that may implement the techniques described in this disclosure.

FIG. 9 is a block diagram illustrating an example video decoder 30 that may implement the techniques described in this disclosure. In the example of FIG. 9, video decoder 30 includes an entropy decoding unit 80, prediction processing unit 81, inverse quantization unit 86, inverse transform processing unit 88, summer 90, and reference picture memory 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 8.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice or interview predicted slice, motion and disparity compensation unit 82 of prediction processing unit 81 produces predictive blocks for a video block of the current video slice based on the temporal motion vectors, disparity motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92, also referred to as a decoded picture buffer (DPB).

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or interview prediction slice type (e.g., B slice, P slice, or GPB slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode. Motion and disparity compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 represents an example of a video decoder configured to decode multiview video data. Video decoder 30 can, for example, be configured to decode one or more pictures in one or more reference views, including a first reference view and determine a disparity vector for a current block based on motion information of one or more neighboring blocks of the current block, wherein the current block is in a second view, wherein the disparity vector points from the current block to a corresponding block in a picture of the same time instance in one of the one or more reference views. The motion information of one of the one or more neighboring blocks may include a motion vector, and in response to determining the motion vector is associated with a reference index corresponding to a reference picture belonging to one of the one or more reference views, video decoder 30 may consider the motion vector to be a disparity motion vector and utilize the disparity motion vector to derive the disparity vector according to techniques described in this disclosure.

Figure 10:
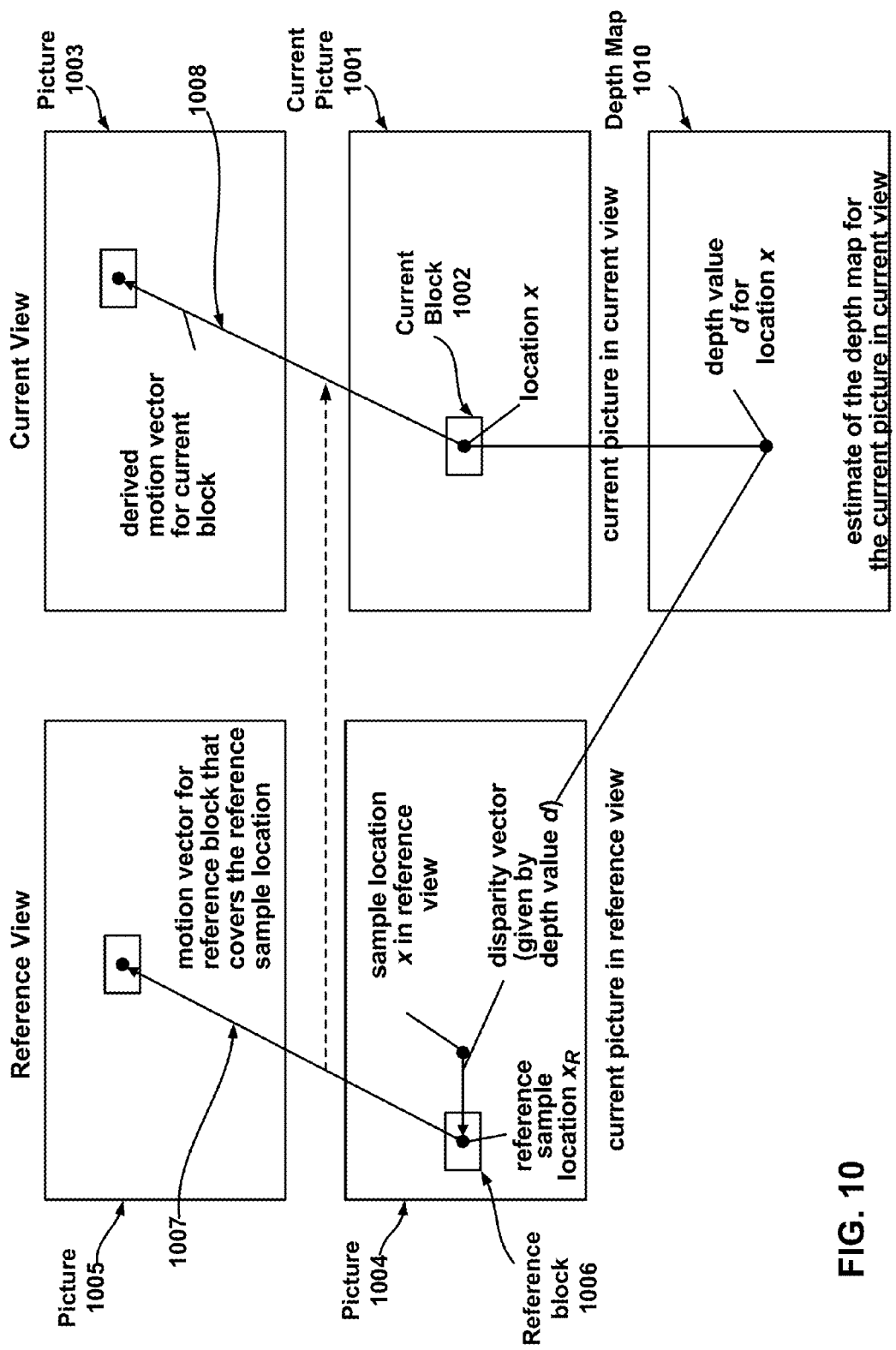
FIG. 10 illustrates an example of the inter-view prediction of motion parameters.

FIG. 10 illustrates the basic concept of the inter-view prediction of motion parameters. The concept of inter-view prediction of motion parameters will be described with reference to both the techniques described above as well as alternate techniques. Video encoder 20 and video decoder 30 may be configured to perform the techniques described with respect to FIG. 10. FIG. 10 shows current picture 1001, and current picture 1001 has current block 1002, which is currently being coded. Picture 1003 represents a previously coded picture that is from the same view as current picture 1001. Picture 1004 represents a picture that is from the same temporal instance as current picture 1001, but picture 1004 is from a different view than current picture 1001. Picture 1005 represents a previously coded picture that is from the same view as picture 1004. FIG. 10 also shows depth map 1010.

For deriving candidate motion parameters (e.g. a candidate for a candidate list in AMVP or merge mode) for a current block in a dependent view, Video encoder 20 and video decoder 30 can determine a disparity vector for current block 1002. According to known techniques, motion and disparity compensation unit 44 and motion and disparity compensation unit 82 can select a sample location x in the middle of current block 1002 and determine a disparity vector by converting the associated depth value d, stored in depth map 1010, to a disparity vector. By adding the disparity vector to the sample location x, Video encoder 20 and video decoder 30 can obtain a reference sample location $x_R$ in the reference view. The prediction block in the already coded picture in the reference view that covers the sample location $x_R$ can be used as the reference block.

In the example of techniques described thus far in reference to FIG. 10, video decoder 30 first needs to derive depth map 1010 to determine disparity vector 1007. There are various ways in which video decoder 30 may derive depth map 1010. As one example, video decoder 30 may use the temporal motion vectors of a picture in a base view, and a depth map that in the base view that corresponds to the picture in the base view to determine/update a depth map for a picture in a dependent view. As another example, video decoder 30 uses temporal motion vectors for pictures in the dependent view and in the base view, and disparity motion vectors for pictures in the dependent view to determine/update depth map 1010 for the pictures in the dependent view. There may be other ways in which to derive depth map 1010.

As one example, at the beginning of the coding process, video decoder 30 may decode a first picture in a base view. The base view may include pictures that are not predicted from pictures in another view. For example, referring to FIG. 3, the base view may be view S0 since pictures in view S0 are not inter-predicted with pictures in any of views S1-S7.

The first picture in view S0 is an intra-predicted picture (i.e., an I-picture represented with the I in view S0 at time T0). Also, a first picture in one of the non-base views (e.g., dependent views) may be inter-view motion predicted or intra-predicted. A non-base view (referred to as a dependent view) may include pictures that are inter-predicted with respect to pictures in another view (e.g., with disparity motion vectors). At this stage of the coding process, no depth map is available.

After the decoding of the first picture in the non-base view, the disparity motion vectors are available (i.e., the disparity motion vectors used to inter-predict blocks in the first picture of the non-base view). These disparity motion vectors can be converted to depth values to generate depth map 1010. Depth map 1010 can be used to map to the base view or used to update the depth maps of the following pictures in the non-base view. From depth map 1010, video decoder 30 may be able to determine the disparity vectors for the blocks.

In general, such techniques for deriving depth map 1010 may be complex and may require video decoder 30 to consume unnecessary processing power and time. In the examples described in this disclosure, video decoder 30 may not need to first derive the depth map to determine the disparity vector for the current block. Instead, video decoder 30 may determine the disparity vector from motion information of spatially and/or temporally neighboring blocks, which may be a less complex task than determining the disparity vector from the derived depth map.

Using FIG. 10 as an example, the concept of inter-view prediction of motion parameters will now be described with reference to the techniques of this disclosure. Video encoder 20 and video decoder 30 may determine a disparity vector for current block 1002 based on motion information of one more neighboring blocks for current block 1002. As part of determining a disparity vector for current block 1002, Video encoder 20 and video decoder 30 may, as described above, identify SDVs, TDVs, and IDVs as candidate disparity vectors and select one of the candidate disparity vectors as a disparity vector for current block 1002. Using the selected disparity vector, video encoder 20 and video decoder 30 can locate reference block 1006 in picture 1004. Using the techniques of this disclosure, reference block 1006 can be located without deriving a depth map such as depth map 1010.

In the example of FIG. 10, picture 1004 is the already coded picture in the reference view, and reference block 1006 is the reference block. If reference block 1006 is coded using MCP, then video encoder 20 and video decoder 30 can use the associated motion parameters of reference block 1006 as candidate motion parameters for current block 1002 in current picture 1001 as part of AMVP or merge mode. Line 1007 represents the motion vector used to predict reference block 1006. Line 1008 represents the same motion vector used to predict reference block 306 being used to predict current block 1002.

In addition to using the motion information of reference blocks 1006 as a candidate in a candidate list for AMVP or merge mode, video encoder 20 and video decoder 30 may also use the derived disparity vector as a candidate disparity motion vector for DCP. When inter-view motion prediction is applied to AMVP or merge mode, video encoder 20 and video decoder 30 may add a candidate derived from a disparity vector to the AMPV/merge candidate list. This candidate can be an inter-view predicted motion vector, such as the motion vector of line 1008 in FIG. 10, or an inter-view disparity motion vector. An inter-view prediction reference picture (e.g. picture 1004) can be put in any position of a reference picture list, just like any inter prediction reference picture. In some instances, if a determined disparity vector has a y-component equal to something other than zero, then video encoder 20 or video decoder 30 may set the y-component of the disparity vector to zero prior to adding the disparity vector to an AMVP/merge mode candidate list for AMVP or merge mode. Thus, the disparity motion vector used in AMVP or merge mode may have the same x-component as the determined disparity vector but may or may not have the same y-component.

In some examples, the determined disparity vector, in accordance with the techniques described in this disclosure, may not be identical to the actual disparity vector of the current block. Again, as one example, the actual disparity vector of the current block may include an x-component, and no y-component, or a zero for the y-component, because the actual disparity vector refers to a corresponding block that is only horizontally displaced relative to the current block. The determined disparity vector, in some examples, includes both an x-component and a y-component because the disparity motion vector used to determine the disparity vector may include both an x-component and a y-component. The determined disparity vector for a block may be referred to as a disparity vector for inter-view motion prediction (DVIVMP) because it is a constructed disparity vector that is used for inter-view motion prediction.

For purposes of contrast, two alternative methods for constructing disparity vectors for inter-view motion prediction will now be briefly discussed. One method involves determining disparity vectors directly from depth view components. The other method involves generating disparity vectors for each pixel only from the disparity vectors and the motion vectors. This mode is sometimes referred to as estimated depth mode. These two modes are not mutually exclusive with the disparity vector derivation techniques described in this disclosure. As will be explained in greater detail below, a video coder, such as video encoder 20 or video decoder 30, may, for example, implement one of these two modes, or a different mode, to determine a disparity vector in instances where the techniques of this disclosure do not produce a disparity vector.

In random access units, all blocks of the base view picture, are intra-coded. In the pictures of dependent views, most blocks are typically coded using DCP and the remaining blocks are intra-coded. When coding the first dependent view in a random access unit, a video coder does not have any depth or disparity information. Hence, candidate disparity vectors can only be derived using a local neighborhood, i.e., by conventional motion vector prediction. After coding the first dependent view in a random access unit, however, the transmitted disparity vectors can be used for deriving a depth map estimate. Therefore, the video coder converts the disparity vectors used for DCP into depth values sets all depth samples of a disparity-compensated block equal to the derived depth value.

The video coder uses the depth map estimate for the picture of the first dependent view in a random access for deriving a depth map for the next picture of the first dependent view. The basic principle of the algorithm is illustrated herein. After coding the picture of the first dependent view in a random access unit, the derived depth map is mapped into the base view and stored together with the reconstructed picture. The next picture of the base view is typically inter-coded. For each block that is coded using MCP, the video coder applies the associated motion parameters to the depth map estimate. A corresponding block of depth map samples is obtained by MCP with the same motion parameters as for the associated texture block. Instead of a reconstructed video picture, the associated depth map estimate is used as reference picture. In order to simplify the motion compensation and avoid the generation of new depth map values, the video coder performs MCP for the depth block without any interpolation. The motion vectors are rounded to a sample-precision before they are used. The video coder again determines the depth map samples of intra-coded blocks on the basis of neighboring depth map samples. Finally, the video coder derives the depth map estimate for the first dependent view, which is used for the inter-view prediction of motion parameters, by mapping the obtained depth map estimate for the base view into the first dependent view. During the mapping process, hole-filling is applied for occlusion regions.

After coding the second picture of the first dependent view, the video coder updates the estimate of the depth map based on actually-coded motion and disparity parameters. For blocks that are coded using DCP, the video coder obtains the depth map samples by converting the disparity vector into a depth value. For blocks that are coded using MCP, the video coder obtains the depth map samples by MCP of the previously estimated depth maps, similar as for the base view. The video coder again determines the depth values for intra-coded blocks by spatial prediction. The video coder maps the updated depth map into the base view and stores it together with the reconstructed picture, where it can also be used for deriving a depth map estimate for other views in the same access unit.

For all following pictures, the video coder repeats the described process. After coding the base view picture, the video coders determines a depth map estimate for the base view picture by MCP using the transmitted motion parameters. This estimate is mapped into the second view and used for the inter-view prediction of motion parameters. After coding the picture of the second view, the video coder updates the depth map using the actually used coding parameters. At the next random access unit, the inter-view motion parameter prediction is not used, and after decoding the first dependent view of the random access unit, the video coders re-initializes the depth map as described above. A disparity motion vector generated by the above method is called a smooth temporal-view predicted (STV) disparity vector. As can be seen by this description, generation of an STV is a relatively complex process compared to the techniques of this disclosure, which include determining a disparity vector by identifying SDVs, TDVs, and IDVs.

This disclosure proposes alternative techniques to those above. The techniques of this disclosure are related to construction of disparity vectors in HEVC based multiview video coding and/or HEVC based 3D video coding. For each block (either a coding unit or prediction unit), one or more disparity vectors can be constructed. A disparity vector may be used for both inter-view motion vector prediction and/or inter-view residual prediction or any other type of inter-view prediction based on disparity between two views. It should be noted that for different types of inter-view prediction, the disparity vector derivation (or construction) techniques invoked may be different. For example, video encoder 20 and video decoder may implement one set of techniques for deriving a disparity vector for use in inter-view residual prediction and implement a different set of techniques for deriving a disparity vector for use in inter-view motion prediction. All of the techniques for disparity vector derivation described in this disclosure, however, can be utilized for different types of inter-view prediction. Therefore, just because certain techniques may be described using one particular type of inter-view prediction as an example, it should not be assumed the described techniques are limited to that particular type of inter-view prediction.

If the techniques described above do not produce a disparity vector (i.e. no SDVs, TDVs, or IDVs are found), then video encoder 20 and video decoder 30 may implement an alternate technique to determine a disparity vector. For example, in response to not identifying an SDV, TDV, or IDV, video encoder 20 or video decoder 30 may generate an STV as described above or may generate a global disparity vector (GDV). A GDV to a corresponding picture of another view may be signaled for each picture, e.g., in the slice header or derived from the camera parameters. A GDV assigns to each pixel the same disparity vector. Video encoder 20, for example, can calculate a GDV for each frame based on the original depth views and transmit the GDV to video decoder 30. Therefore, at video decoder 30, there is no need to calculate the disparity vector which reduces the computational complexity. Video encoder 20 and video decoder 30 may use the GDV to predict a disparity motion vector for inter-view prediction or use the GDV to locate a corresponding prediction unit of a coding unit in a reference view of the same access unit. When signaled at the picture level, interpolation/prediction of a GDV from the GDV values of the temporal neighboring pictures may be possible. Interpolation/extrapolation/prediction of a GDV corresponding to one pair of views from a different pair of views may also be possible. In some instances, a GDV can be replaced by a zero disparity vector.

Video encoder 20 and video decoder 30 may be configured to utilize disparity vectors determined based on SDVs, TDVs, and IDVs differently than disparity vectors determined based on STVs and GDVs. As one example, when generating a candidate list for AMVP or merge mode, video encoder 20 and video decoder 30 may be configured to give a disparity motion vector determined from an SDV, TDV, or IDV a higher priority over a disparity motion vector determined based on a GDV or STV, where priority generally refers to the order in which candidates are considered for inclusion in the candidate list. A disparity vector generated using SDVs, TDVs, and IDVs may provide a more accurate estimate of the corresponding relationship between blocks of two views as compared to a GDV, which is why in some implementations, video encoder 20 and video decoder 30 may be configured to prioritize a disparity vector determined from a SDV, TDV, or IDV higher than a disparity vector determined based on a GDV. Additionally, video encoder 20 and video decoder 30 may only use a GDV or STV in some coding operations and not others. For example, video encoder 20 and video decoder 20 may use GDVs and STVs for inter-view motion prediction but not for inter-view residual prediction.

When implementing the techniques of this disclosure, if either the current view or the reference view of a disparity vector is different from the expected disparity vector for a given current view and a target reference view, video encoder 20 and video decoder 30 may scale the disparity vector. That is, video encoder 20 and video decoder 20 may scale the disparity vector based on a difference between a view to which the disparity vector points and a target reference view. The scaling process may, for example, be performed by taking into consideration the geometry of the locations of the views, such as the view_id values or the horizontal locations. For a given current view and a given target reference view, if no disparity vector is found in the disparity vector candidate list, a disparity vector in disVecCan can be scaled.

Figure 11A:
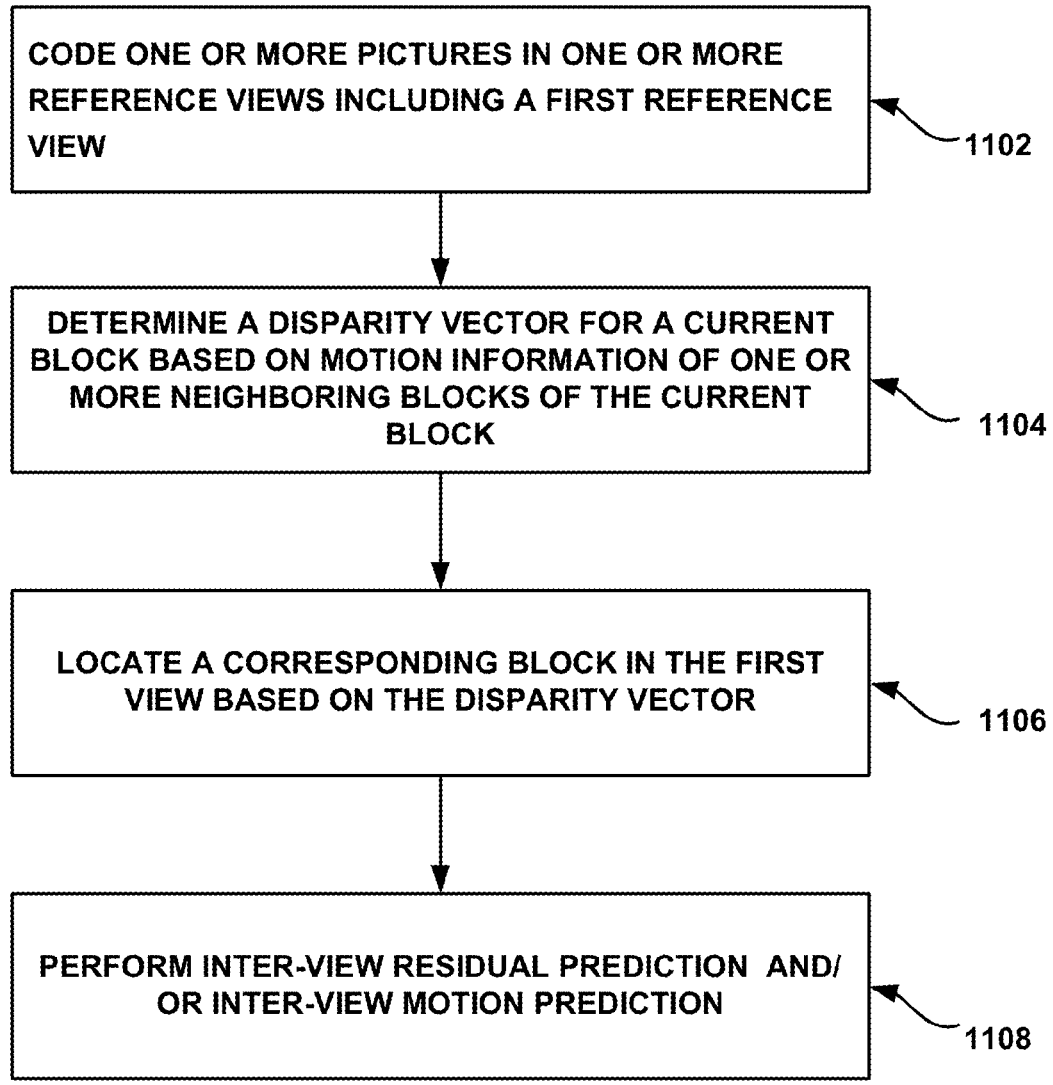
FIG. 11A is a flowchart illustrating an example operation to determine and a disparity vector in accordance with the techniques of this disclosure.

FIG. 11A is a flowchart illustrating one way to determine and use a disparity vector according to the techniques of this disclosure. The techniques of FIG. 11A will be described with reference to a generic video coder. This generic video coder may, for example, correspond to either of video encoder 20 or video decoder 30.

As shown in FIG. 11A, the video coder (e.g., encoder 20 or decoder 30) codes one or more pictures in one or more reference views, including a first view (1102). The video coder can determine a disparity vector for a current block based on motion information of one or more neighboring blocks of the current block (1104). The current block can be in a second view that is different than the first view and is not one of the reference views. The one or more neighboring blocks may include either or both of spatial neighboring blocks and temporal neighboring blocks. The disparity vector points from the current block to a corresponding block in a picture of the same time instance in one of the one or more reference views. The video coder can locate a corresponding block in the first view based on the disparity vector (1106). The video coder may, for example, determine a reference view associated with the disparity vector and identify a reference block in an inter-view reference picture of the reference view. The corresponding block may be a reference block in the first reference view. Using the located corresponding block, the video coder can perform inter-view residual prediction and/or inter-view motion prediction (1108).

In some examples, the one or more neighboring blocks may include a spatial neighboring block, and the video coder may determine the disparity vector for the current block by determining a disparity motion vector associated with the spatial neighboring block. In some examples, the one or more neighboring blocks may include a temporal neighboring block, and the video coder may determine the disparity vector for the current block by determining a disparity motion vector associated with the temporal neighboring block. In some examples, the disparity vector may be an implicit disparity vector. The video coder can determine the implicit disparity vector, for example, by identifying one or more disparity vectors stored for the one or more neighboring blocks during coding of the one or more neighboring blocks. The one or more stored disparity vectors can be determined for the one or more neighboring blocks during an inter-view motion parameter prediction used for the neighboring block.

When performing inter-view motion prediction, the video coder may add the disparity vector to a candidate list for use in one of merge mode and AMVP mode. For example, the video coder may convert the disparity vector to a disparity motion vector and insert the disparity motion vector into one of an AMVP candidate list and a merge candidate list.

Figure 11B:
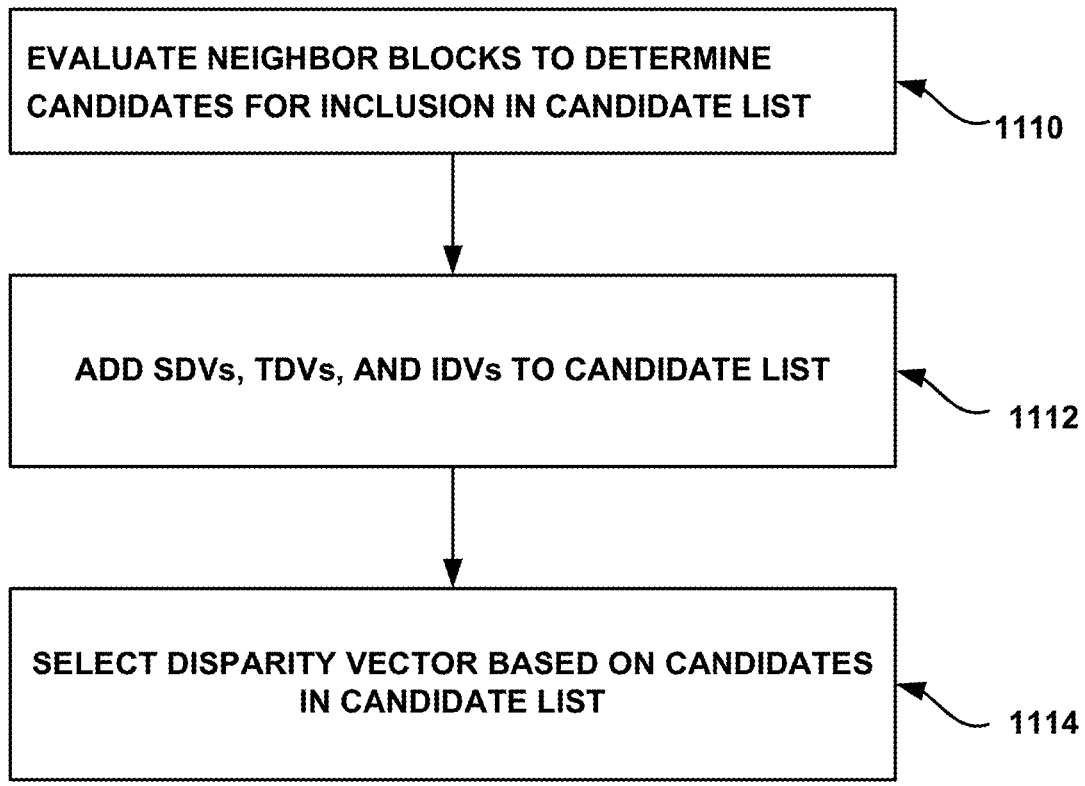
FIG. 11B is a flowchart illustrating an example operation to determine and a disparity vector in accordance with the techniques of this disclosure.

FIG. 11B is a flowchart illustrating an example operation to determine a disparity vector according to the techniques of this disclosure. The techniques of FIG. 11B will be described with reference to the same generic video coder as FIG. 11A. The techniques of FIG. 11B are one example that illustrates how the video decoder may determine a disparity vector for a current block based on motion information of one or more neighboring blocks of the current block. Thus, the techniques of FIG. 11B can be used to implement block 1104 of FIG. 11A.

The video coder can evaluate neighboring blocks to determine potential candidates for inclusion in a candidate list (1110). The neighboring blocks may include either or both of spatial neighboring blocks and temporal neighboring blocks. As explained above, the video coder may evaluate potential candidates for inclusion in a candidate list by determining spatial neighboring blocks and determining if those spatial neighboring blocks were coded using a disparity motion vector. In other words, the video coder can identify SDVs for inclusion in the candidate list. Additionally, as explained above, the video coder may evaluate potential candidates for inclusion in a candidate list by determining temporal neighboring blocks and determining if those temporal neighboring blocks were coded using a disparity motion vector. In other words, the video coder can identify TDVs for inclusion in the candidate list. Additionally, as explained above, the video coder may determine if a PU is coded with at least one of its motion vectors predicted from inter-view motion parameter prediction (i.e. derived from other views based on a disparity vector). In other words, the video coder can identify IDVs for inclusion in the candidate list.

The video coder can add identified SDVs, TDVs, and IDVs to the candidate list (1112), and the video coder can select a disparity vector for the current block based on the candidates in the candidate list (1114). The video coder may, for example, select the disparity vector is based on a frequency of occurrence of one or more of the candidate disparity vectors in the candidate list.

Figure 11C:
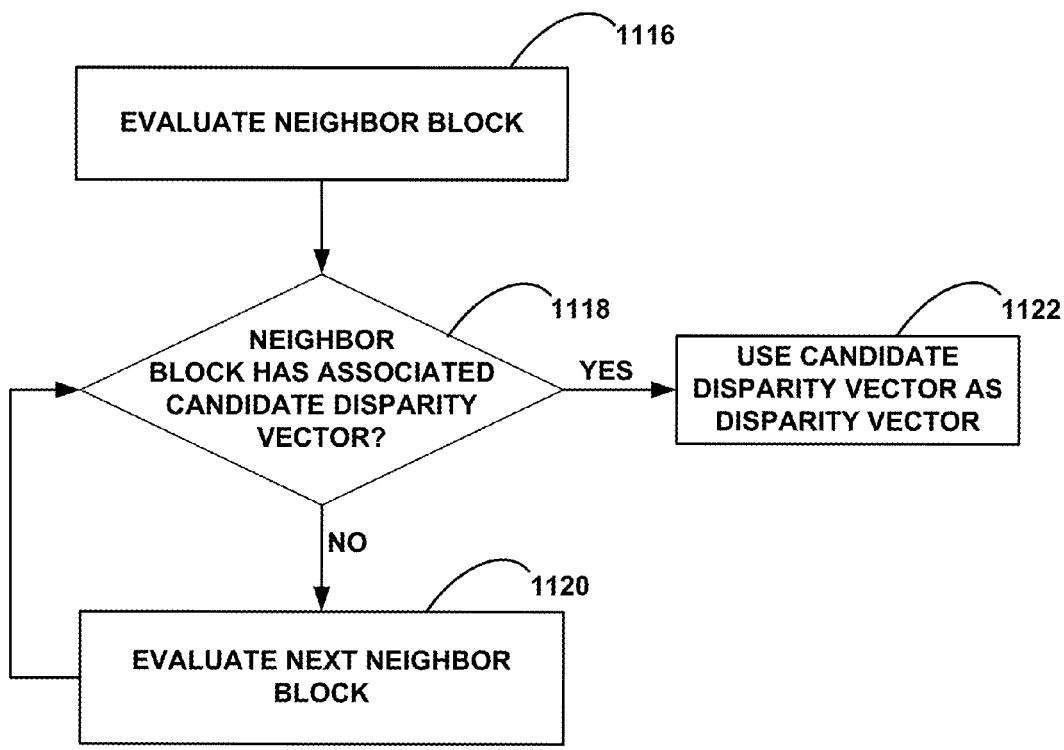
FIG. 11C is a flowchart illustrating an example operation to determine and a disparity vector in accordance with the techniques of this disclosure.

FIG. 11C is a flowchart illustrating one way to determine a disparity vector according to the techniques of this disclosure. The techniques of FIG. 11C will be described with reference to a generic video coder, which may correspond to encoder 20, decoder 30 or another coder. The techniques of FIG. 11C are one example of how the video decoder may determine a disparity vector for a current block based on motion information of one or more neighboring blocks of the current block. Thus, the techniques of FIG. 11C can be used to implement block 1104 of FIG. 11A.

The video coder can evaluate a neighboring block to determine if the neighboring block has an associated candidate disparity vector (1116). The neighboring blocks may include either or both of spatial neighboring blocks and temporal neighboring blocks. An associated candidate disparity vector may, for example, refer to an SDV, TDV, or IDV, as described above. If the neighboring block does not have an associated candidate disparity vector (1118, No), then a next neighboring block can be evaluated to determine if the next neighboring block has an associated candidate disparity vector (1120). As described above, the video coder can evaluate the neighboring blocks in a set order. If a neighboring block has an associated candidate disparity vector (1118, Yes), then the video coder can use the candidate disparity vector as a disparity vector for the current block (1122). According to the techniques of FIG. 11C, a video coder can evaluate a plurality of neighboring blocks to determine if one of the plurality of neighboring blocks produces a candidate disparity vector and terminate the evaluating of the plurality of neighboring blocks upon identifying a candidate disparity vector.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding multiview video data, the method comprising:
   decoding one or more pictures in one or more reference views of the multiview video data;
   in response to determining that a motion vector of one or more neighboring blocks of a current block of the multiview video data is associated with a reference index corresponding to a reference picture belonging to one of the one or more reference views of the multiview video data, considering the motion vector to be a disparity motion vector for the one or more neighboring blocks, wherein the current block is in a view other than the one or more reference views;
   deriving a disparity vector for the current block based on the disparity motion vector of the one or more neighboring blocks, wherein the derived disparity vector points from the current block to a corresponding block in a picture of the same time instance in one of the one or more reference views; and
   decoding the current block using the derived disparity vector.

2. The method of claim 1, further comprising:
   determining a reference view associated with the derived disparity vector; and
   identifying a reference block in an inter-view reference picture of the reference view based on the derived disparity vector.

3. The method of claim 1, further comprising:
   determining a reference view associated with the derived disparity vector; and
   creating a disparity motion vector for the current block based on the derived disparity vector, wherein the reference index of the disparity motion vector for the current block corresponds to an inter-view reference picture from the reference view.

4. The method of claim 1, wherein the one or more neighboring blocks comprise one or more spatial neighboring blocks, and wherein the disparity motion vector is associated with one of the spatial neighboring blocks.

5. The method of claim 1, wherein the one or more neighboring blocks comprise one or more temporal neighboring blocks, and the disparity vector for the current block comprises determining the disparity motion vector, wherein the disparity motion vector is associated with one of the temporal neighboring blocks.

6. The method of claim 5, wherein the one or more temporal neighboring blocks comprise blocks in one or more temporal reference pictures.

7. The method of claim 6, wherein the one or more temporal reference pictures comprise a co-located picture used in temporal motion vector prediction.

8. The method of claim 5, wherein the temporal neighboring block comprises one or more prediction units or prediction blocks of a coding unit, wherein the coding unit comprises a co-located block of the current block.

9. The method of claim 5, wherein the temporal neighboring block comprises one or more prediction units or prediction blocks of a largest coding unit, wherein the largest coding unit comprises a co-located block of the current block.

10. The method of claim 1, wherein the one or more neighboring blocks comprise one or more spatial neighboring blocks and one or more temporal neighboring blocks, and wherein the disparity motion vector is associated with one of the spatial neighboring blocks or one of the temporal neighboring blocks.

11. The method of claim 4, wherein the one or more spatial neighboring blocks comprise spatial neighboring blocks which are to be accessed by existing coding tools in two-dimensional (2D) video codecs.

12. The method of claim 11, wherein the existing coding tools comprise an advanced motion vector prediction (AMVP) process.

13. The method of claim 12, wherein an order in which a plurality of spatial neighboring blocks of the one or more spatial neighboring blocks are checked corresponds to an order in which blocks of corresponding locations are checked during the AMVP process.

14. The method of claim 11, wherein the existing coding tools comprise a merge process.

15. The method of claim 13, wherein an order in which a plurality of spatial neighboring blocks of the one or more spatial neighboring blocks are checked corresponds to an order in which blocks of corresponding locations are checked during the merge process.

16. The method of claim 1, wherein the derived disparity vector comprises an implicit disparity vector.

17. The method of claim 16, wherein deriving the implicit disparity vector comprises identifying one or more disparity vectors stored for the one or more neighboring blocks during coding of the one or more neighboring blocks, wherein the one or more disparity vectors are determined for the one or more neighboring blocks during an inter-view motion parameter prediction for the neighboring block.

18. The method of claim 2, further comprising:
    performing inter-view motion prediction using information of the reference block of the inter-view reference picture in the reference view determined by the derived disparity vector of the current block.

19. The method of claim 18, wherein performing inter-view motion prediction comprises generating, based on the derived disparity vector, a candidate for a candidate list for use in one of a merge mode and an advanced motion vector prediction (AMVP) mode.

20. The method of claim 19, wherein generating the candidate for the candidate list comprises adding a disparity motion vector of the current block to the candidate list, wherein the disparity motion vector of the current block has a same x-component as the derived disparity vector, and wherein the disparity motion vector of the current block has a same y-component as the derived disparity vector.

21. The method of claim 19, wherein generating the candidate for the candidate list comprises adding a disparity motion vector of the current block to the candidate list, wherein the disparity motion vector of the current block has a same x-component as the derived disparity vector, and wherein the disparity motion vector of the current block has a y-component equal to zero.

22. The method of claim 1, further comprising:
    converting the derived disparity vector to a disparity motion vector of the current block;
    inserting the disparity motion vector of the current block into one of an advanced motion vector prediction (AMVP) candidate list and a merge candidate list.

23. The method of claim 1, further comprising: determining one or more candidate disparity vectors, wherein the disparity motion vector comprises one of the candidate disparity vectors, wherein deriving the disparity vector comprises selecting one of the one or more candidate disparity vectors as the derived disparity vector.

24. The method of claim 23, wherein the one or more candidate disparity vectors comprises at least one spatial disparity vector.

25. The method of claim 23, wherein the one or more candidate disparity vectors comprises at least one temporal disparity vector.

26. The method of claim 23, wherein the one or more candidate disparity vectors comprises at least one implicit disparity vector.

27. The method of claim 23, further comprising:
excluding from the one or more candidate disparity vectors candidates that point to a target view that is different than a target view for the current block.

28. The method of claim 23, further comprising:
performing disparity vector scaling on a candidate disparity vector from the one or more candidate disparity vectors.

29. The method of claim 23, wherein selecting one of the one or more candidate disparity vectors as the derived disparity vector comprises selecting one of the one or more candidate disparity vectors based on a frequency of occurrence of the one or more of the candidate disparity vectors.

30. The method of claim 1, wherein the method further comprises:
evaluating a plurality of neighboring blocks to determine if one of the plurality of neighboring blocks produces an available candidate disparity vector, wherein the disparity motion vector comprises the available candidate disparity vector; and
terminating the evaluating of the plurality of neighboring blocks upon identifying the available candidate disparity vector,
wherein deriving the disparity vector for the current block comprises using the available candidate disparity vector as the derived disparity vector.

31. The method of claim 30, wherein the disparity motion vector comprises a candidate disparity vector that points to a target view that is different than a target reference view of the current block, the method further comprising:
treating the candidate disparity vector as an unavailable candidate disparity vector.

32. The method of claim 31, wherein treating the candidate disparity vector as the unavailable candidate comprises not terminating the evaluating of the plurality of neighboring blocks upon identifying the unavailable candidate disparity vector.

33. The method of claim 1, wherein the corresponding block comprises a reference block.

34. The method of claim 1, wherein the one or more neighboring blocks comprise a plurality of spatial neighboring blocks corresponding to blocks checked during a motion vector prediction process.

35. The method of claim 1, further comprising:
determining a second disparity vector for a second current block, wherein the second disparity vector comprises a global disparity vector; and
determining, for the second current block, a corresponding block in a picture in one of the reference views based on the second disparity vector.

36. The method of claim 1, further comprising:
determining a second disparity vector for a second current block, wherein the second disparity vector comprises a smooth temporal-view predicted (STV) disparity vector; and determining, for the second current block, a corresponding block in a picture in one of the reference views based on the second disparity vector.

37. The method of claim 1, further comprising:
scaling the derived disparity vector based on a difference between a view to which the derived disparity vector points and a target reference view.

38. A device for decoding multiview video data, the device comprising:
a memory unit configured to store one or more neighboring blocks of a current block; and
a video decoder configured to:
decode one or more pictures in one or more reference views of the multiview video data;
in response to determining that a motion vector of the one or more neighboring blocks of the current block of the multiview video data is associated with a reference index corresponding to a reference picture belonging to one of the one or more reference views, consider the motion vector to be a disparity motion vector of the one or more neighboring blocks, wherein the current block is in a view other than the one or more reference views;
derive a disparity vector for the current block based on the disparity motion vector of the one or more neighboring blocks, wherein the derived disparity vector points from the current block to a corresponding block in a picture of the same time instance in one of the one or more reference views; and
decode the current block using the derived disparity vector.

39. A device for encoding multiview video data, the device comprising:
a memory unit configured to store one or more neighboring blocks of a current block; and
a video encoder configured to:
encode one or more pictures in one or more reference views of the multiview video data;
in response to determining that a motion vector of the one or more neighboring blocks of the current block of the multiview video data is associated with a reference index corresponding to a reference picture belonging to one of the one or more reference views of the multiview video data, consider the motion vector to be a disparity motion vector of the one or more neighboring blocks, wherein the current block is in a view other than the one or more reference views;
derive a disparity vector for the current block based on the disparity motion vector of the one or more neighboring blocks, wherein the derived disparity vector points from the current block to a corresponding block in a picture of the same time instance in one of the one or more reference views; and
encode the current block using the derived disparity vector.

40. The device of claim 38, wherein the video decoder is further configured to determine a reference view associated with the derived disparity vector and identify a reference block in an inter-view reference picture of the reference view.

41. The device of claim 38, wherein the video decoder is further configured to:
determine a reference view associated with the derived disparity vector; and
create a disparity motion vector for the current block based on the derived disparity vector, wherein the reference index of the disparity motion vector corresponds to an inter-view reference picture from the reference view.

42. The device of claim 38, wherein the one or more neighboring blocks comprise one or more spatial neighboring blocks, and wherein the disparity motion vector is associated with one of the spatial neighboring blocks.

43. The device of claim 38, wherein the one or more neighboring blocks comprise one or more temporal neighboring blocks, and wherein the disparity motion vector is associated with one of the temporal neighboring blocks.

44. The device of claim 43, wherein the one or more temporal neighboring blocks comprise blocks in one or more temporal reference pictures.

45. The device of claim 44, wherein the one or more temporal reference pictures comprise a co-located picture used in temporal motion vector prediction.

46. The device of claim 43, wherein the temporal neighboring block comprises one or more prediction units or prediction blocks of a coding unit, wherein the coding unit comprises a co-located block of the current block.

47. The device of claim 43, wherein the temporal neighboring block comprises one or more prediction units or prediction blocks of a largest coding unit, wherein the largest coding unit comprises a co-located block of the current block.

48. The device of claim 38, wherein the one or more neighboring blocks comprise one or more spatial neighboring blocks and one or more temporal neighboring blocks, and wherein the disparity motion vector is associated with one of the spatial neighboring blocks or one of the temporal neighboring blocks.

49. The device of claim 38, wherein the one or more spatial neighboring blocks comprise spatial neighboring blocks which are to be accessed by an existing coding tool in two-dimensional (2D) video codecs.

50. The device of claim 49, wherein the existing coding tool comprises an advanced motion vector prediction (AMVP) process.

51. The device of claim 50, wherein an order in which a plurality of spatial neighboring blocks of the one or more neighboring blocks are checked corresponds to an order in which blocks of corresponding locations are checked during the AMVP process.

52. The device of claim 49, wherein the existing coding tool comprises a merge process.

53. The device of claim 52, wherein an order in which a plurality of spatial neighboring blocks of the one or more neighboring blocks are checked corresponds to an order in which blocks of corresponding locations are checked during the merge process.

54. The device of claim 38, wherein the derived disparity vector comprises an implicit disparity vector.

55. The device of claim 54, wherein the video decoder derives the implicit disparity vector by identifying one or more disparity vectors stored for the one or more neighboring blocks during coding of the one or more neighboring blocks, wherein the one or more disparity vectors are determined for the one or more neighboring blocks during an inter-view motion parameter prediction for the neighboring block.

56. The device of claim 40, wherein the video decoder is further configured to:
perform inter-view motion prediction using information of the reference block of the inter-view reference picture in the reference view determined by the derived disparity vector of the current block.

57. The device of claim 56, wherein the video decoder is configured to perform inter-view motion prediction by generating, based on the derived disparity vector, a candidate for a candidate list for use in one of merge mode and advanced motion vector prediction (AMVP) mode.

58. The device of claim 56, wherein the video decoder is configured to generate the candidate for the candidate list by adding a disparity motion vector of the current block to the candidate list, wherein the disparity motion vector of the current block has a same x-component as the derived disparity vector, and wherein the disparity motion vector of the current block has a same y-component as the derived disparity vector.

59. The device of claim 56, wherein the video decoder is configured to generate the candidate for the candidate list by adding a disparity motion vector of the current block to the candidate list, wherein the disparity motion vector of the current block has a same x-component as the derived disparity vector, and wherein the disparity motion vector of the current block has a y-component equal to zero.

60. The device of claim 38, wherein the video decoder is further configured to:
convert the derived disparity vector to a disparity motion vector of the current block;
insert the disparity motion vector of the current block into one of an advanced motion vector prediction (AMVP) candidate list and a merge candidate list.

61. The device of claim 38, wherein the video decoder is configured to determine one or more candidate disparity vectors, and wherein the disparity motion vector comprises one of the candidate disparity vectors, and wherein the video decoder is configured to derive the disparity vector by selecting one of the one or more candidate disparity vectors as the derived disparity vector.

62. The device of claim 61, wherein the one or more candidate disparity vectors comprises at least one spatial disparity vector.

63. The device of claim 61, wherein the one or more candidate disparity vectors comprises at least one temporal disparity vector.

64. The device of claim 61, wherein the one or more candidate disparity vectors comprises at least one implicit disparity vector.

65. The device of claim 61, wherein the video decoder is further configured to:
exclude from the one or more candidate disparity vectors candidates that point to a target view that is different than a target view for the current block.

66. The device of claim 61, wherein the video decoder is further configured to:
perform disparity vector scaling on a candidate disparity vector from the one or more candidate disparity vectors.

67. The device of claim 61, wherein the video decoder is configured to select one of the one or more candidate disparity vectors as the derived disparity vector based on a frequency of occurrence of the one or more of the candidate disparity vectors.

68. The device of claim 38, wherein the video decoder is further configured to:
evaluate a plurality of neighboring blocks to determine if one of the plurality of neighboring blocks produces an available candidate disparity vector, wherein the disparity motion vector comprises the available candidate disparity vector; and terminate the evaluating of the plurality of neighboring blocks upon identifying the available candidate disparity vector,
wherein the video decoder is configured to derive the disparity vector for the current block by using the available candidate disparity vector as the derived disparity vector.

69. The device of claim 68, wherein the disparity motion vector comprises a candidate disparity vector that points to a target view that is different than a target reference view of the current block, and
wherein the video decoder is further configured to treat the candidate disparity vector as an unavailable candidate disparity vector.

70. The device of claim 69, wherein the video decoder is configured to treat the candidate disparity vector as the unavailable candidate by not terminating the evaluating of the plurality of neighboring blocks upon identifying the unavailable candidate disparity vector.

71. The device of claim 38, wherein the corresponding block comprises a reference block.

72. The device of claim 38, wherein the one or more neighboring blocks comprise a plurality of spatial neighboring blocks corresponding to blocks checked during a motion vector prediction process.

73. The device of claim 38, wherein the video decoder is further configured to:
determine a second disparity vector for a second current block, wherein the second disparity vector comprises a global disparity vector; and
determine, for the second current block, a corresponding block in a picture in one of the reference views based on the second disparity vector.

74. The device of claim 38, wherein the video decoder is further configured to:
determine a second disparity vector for a second current block, wherein the second disparity vector comprises a smooth temporal-view predicted (STV) disparity vector; and
determine, for the second current block, a corresponding block in a picture in one of the reference views based on the second disparity vector.

75. The device of claim 38, wherein the video decoder is further configured to:
scale the derived disparity vector based on a difference between a view to which the derived disparity vector points and a target reference view.

76. The device of claim 38, wherein the device comprises one of:
an integrated circuit;
a microprocessor; or
a wireless communication device that comprises the video decoder.

77. A device for coding multiview video data, the device comprising:
means for coding one or more pictures in one or more reference views of the multiview video data;
means for considering a motion vector of one or more neighboring blocks of a current block of the multiview video data to be a disparity motion vector of the one or more neighboring blocks in response to determining that the motion vector of the one or more neighboring blocks of the current block is associated with a reference index corresponding to a reference picture belonging to one of the one or more reference views of the multiview video data, wherein the current block is in a view other than the one or more reference views;
means for deriving a disparity vector for the current block based on the disparity motion vector of the one or more neighboring blocks, wherein the derived disparity vector points from the current block to a corresponding block in a picture of the same time instance in one of the one or more reference views; and
means for coding the current block using the disparity vector.

78. A non-transitory computer-readable storage medium storing instructions that when executed cause one or more processors to:
code one or more pictures in one or more reference views of the multiview video data;
consider a motion vector of one or more neighboring blocks of a current block to be a disparity motion vector of the one or more neighboring blocks in response to determining that the motion vector of the one or more neighboring blocks of the current block of the multiview video data is associated with a reference index corresponding to a reference picture belonging to one of the one or more reference views of the multiview video data, wherein the current block is in a view other than the one or more reference views;
derive a disparity vector for the current block based on the disparity motion vector of the one or more neighboring blocks, wherein the derived disparity vector points from the current block to a corresponding block in a picture of the same time instance in one of the one or more reference views; and
code the current block using the disparity vector.

79. The non-transitory computer-readable storage medium of claim 78, further storing instructions that when executed cause the one or more processors to:
determine a reference view associated with the derived disparity vector; and
identify a reference block in an inter-view reference picture of the reference view based on the derived disparity vector.

80. The non-transitory computer-readable storage medium of claim 78, wherein the one or more neighboring blocks comprise one or more spatial neighboring blocks, and wherein the disparity motion vector is associated with one of the spatial neighboring blocks.

81. The non-transitory computer-readable storage medium of claim 78, wherein the one or more neighboring blocks comprise one or more temporal neighboring blocks, and wherein the disparity motion vector is associated with one of the temporal neighboring blocks.

82. The non-transitory computer-readable storage medium of claim 78, wherein the one or more neighboring blocks comprise one or more spatial neighboring blocks and one or more temporal neighboring blocks, and wherein the disparity motion vector is associated with one of the spatial neighboring blocks or one of the temporal neighboring blocks.

83. The non-transitory computer-readable storage medium of claim 78, wherein the derived disparity vector comprises an implicit disparity vector.

84. The non-transitory computer-readable storage medium of claim 83, wherein the one or more processors derive the implicit disparity vector by identifying one or more disparity vectors stored for the one or more neighboring blocks during coding of the one or more neighboring blocks, wherein the one or more disparity vectors are determined for the one or more neighboring blocks during an inter-view motion parameter prediction is used for the neighboring block.

85. The non-transitory computer-readable storage medium of claim 79 further storing instructions that when executed cause the one or more processors to:
perform inter-view motion prediction using information of the reference block of the inter-view reference picture in the reference view determined by the derived disparity vector of the current block.

86. The non-transitory computer-readable storage medium of claim 85, wherein the one or more processors perform inter-view motion prediction by generating, based on the derived disparity vector, a candidate for a candidate list for use in one of merge mode and advanced motion vector prediction (AMVP) mode.

87. The non-transitory computer-readable storage medium of claim 78, further storing instructions that when executed cause the one or more processors to:
convert the derived disparity vector to a disparity motion vector of the current block; and
insert the disparity motion vector of the current block into one of an advanced motion vector prediction (AMVP) candidate list and a merge candidate list.

88. The non-transitory computer-readable storage medium of claim 78, further comprising instructions that cause the one or more processors to determine one or more candidate disparity vectors, wherein the disparity motion vector comprises one of the candidate disparity vectors,
wherein the instructions that cause the one or more processors to derive the disparity vector comprises instructions that cause the one or more processors to select one of the one or more candidate disparity vectors as the derived disparity vector.

89. The non-transitory computer-readable storage medium of claim 78, further storing instructions that when executed cause the one or more processors to:
evaluate a plurality of neighboring blocks to determine if one of the plurality of neighboring blocks produces an available candidate disparity vector, wherein the disparity motion vector comprises the available candidate disparity vector;
terminate the evaluating of the plurality of neighboring blocks upon identifying the available candidate disparity vector,
wherein the one or more processors derive the disparity vector for the current block by using the available candidate disparity vector as the derived disparity vector.

90. The non-transitory computer-readable storage medium of claim 78, further storing instructions that when executed cause the one or more processors to:
determine a second disparity vector for a second current block, wherein the second disparity vector comprises a global disparity vector; and
determine, for the second current block, a corresponding block in a picture in one of the reference views based on the second disparity vector.

91. The non-transitory computer-readable storage medium of claim 78, further storing instructions that when executed cause the one or more processors to:
determine a second disparity vector for a second current block, wherein the second disparity vector comprises a smooth temporal-view predicted (STV) disparity vector; and
determine, for the second current block, a corresponding block in a picture in one of the reference views based on the second disparity vector.

92. The non-transitory computer-readable storage medium of claim 78, further storing instructions that when executed cause the one or more processors to:
scale the derived disparity vector based on a difference between a view to which the derived disparity vector points and a target reference view.

93. A method of encoding multiview video data, the method comprising:
encoding one or more pictures in one or more reference views of the multiview video data;
in response to determining that a motion vector of one or more neighboring blocks of a current block of the multiview video data is associated with a reference index corresponding to a reference picture belonging to one of the one or more reference views of the multiview video data, considering the motion vector to be a disparity motion vector for the one or more neighboring blocks, wherein the current block is in a view other than the one or more reference views;
deriving a disparity vector for the current block based on the disparity motion vector of the one or more neighboring blocks, wherein the derived disparity vector points from the current block to a corresponding block in a picture of the same time instance in one of the one or more reference views; and
encoding the current block using the derived disparity vector.

94. The method of claim 93, further comprising:
determining a reference view associated with the derived disparity vector; and
identifying a reference block in an inter-view reference picture of the reference view based on the derived disparity vector.

95. The method of claim 94, wherein the one or more neighboring blocks comprise one or more spatial neighboring blocks, and wherein the disparity motion vector is associated with one of the spatial neighboring blocks.

96. The method of claim 94, wherein the one or more neighboring blocks comprise one or more temporal neighboring blocks, and wherein the disparity motion vector is associated with one of the temporal neighboring blocks.

97. The method of claim 94, wherein the one or more neighboring blocks comprise one or more spatial neighboring blocks and one or more temporal neighboring blocks, and wherein the disparity motion vector is associated with one of the spatial neighboring blocks or one of the temporal neighboring blocks.

98. The method of claim 94, wherein the derived disparity vector comprises an implicit disparity vector.

99. The method of claim 98, wherein deriving the implicit disparity vector comprises identifying one or more disparity vectors stored for the one or more neighboring blocks during coding of the one or more neighboring blocks, wherein the one or more disparity vectors are determined for the one or more neighboring blocks during an inter-view motion parameter prediction for the neighboring block.

100. The method of claim 94, further comprising:
performing inter-view motion prediction using information of the reference block of the inter-view reference picture in the reference view determined by the derived disparity vector of the current block.

101. The method of claim 100, wherein performing inter-view motion prediction comprises generating, based on the derived disparity vector, a candidate for a candidate list for use in one of merge mode and advanced motion vector prediction (AMVP) mode.

102. The method of claim 93, further comprising:
converting the derived disparity vector to a disparity motion vector of the current block; and
inserting the disparity motion vector of the current block into one of an advanced motion vector prediction (AMVP) candidate list and a merge candidate list.

103. The method of claim 93, further comprising determining one or more candidate disparity vectors, wherein the disparity motion vector comprises one of the candidate disparity vectors, and
wherein deriving the disparity vector comprises selecting one of the one or more candidate disparity vectors as the derived disparity vector.

104. The method of claim 93, further comprising:
evaluating a plurality of neighboring blocks to determine if one of the plurality of neighboring blocks produces an available candidate disparity vector, wherein the disparity motion vector comprises the available candidate disparity vector; and
terminating the evaluating of the plurality of neighboring blocks upon identifying the available candidate disparity vector,
wherein deriving the disparity vector for the current block comprises using the available candidate disparity vector as the derived disparity vector.

105. The method of claim 93, further comprising:
determining a second disparity vector for a second current block, wherein the second disparity vector comprises a global disparity vector; and
determining, for the second current block, a corresponding block in a picture in one of the reference views based on the second disparity vector.

106. The method of claim 93, further comprising:
determining a second disparity vector for a second current block, wherein the second disparity vector comprises a smooth temporal-view predicted (STV) disparity vector; and
determining, for the second current block, a corresponding block in a picture in one of the reference views based on the second disparity vector.

107. The method of claim 93, further comprising:
scaling the derived disparity vector based on a difference between a view to which the derived disparity vector points and a target reference view.

108. The device of claim 77, wherein means for coding one or more pictures comprises means for encoding the one or more pictures, and wherein means for coding the current block comprises means for encoding the current block.

109. The device of claim 77, wherein means for coding one or more pictures comprises means for decoding the one or more pictures, and wherein means for coding the current block comprises means for decoding the current block.

110. The non-transitory computer-readable storage medium of claim 78, wherein the instructions that when executed cause the one or more processors to code one or more pictures comprise instructions that when executed cause the one or more processors to encode the one or more pictures, and wherein the instructions that when executed cause the one or more processors to code the current block comprises instructions that when executed cause the one or more processors to encode the current block.

111. The non-transitory computer-readable storage medium of claim 78, wherein the instructions that when executed cause the one or more processors to code one or more pictures comprise instructions that when executed cause the one or more processors to decode the one or more pictures, and wherein the instructions that when executed cause the one or more processors to code the current block comprises instructions that when executed cause the one or more processors to decode the current block.

* * * * *